UNIVERSAL LINE CONCENTRATOR

Filed May 22, 1961

INVENTOR
G. F. ABBOTT, JR.
BY
ATTORNEY

INVENTOR
G. F. ABBOTT, JR.
BY
[signature]
ATTORNEY

INVENTOR
G. F. ABBOTT, JR.
BY
ATTORNEY

Dec. 1, 1964 G. F. ABBOTT, JR 3,159,715

UNIVERSAL LINE CONCENTRATOR

Filed May 22, 1961 9 Sheets-Sheet 4

INVENTOR
G. F. ABBOTT, JR.
BY James W. Falk
ATTORNEY

UNIVERSAL LINE CONCENTRATOR

Filed May 22, 1961 9 Sheets-Sheet 5

INVENTOR
G. F. ABBOTT, JR.
BY
ATTORNEY

UNIVERSAL LINE CONCENTRATOR

Filed May 22, 1961 9 Sheets-Sheet 6

INVENTOR
BY G. F. ABBOTT, JR.
ATTORNEY

INVENTOR
G. F. ABBOTT, JR.
BY
[signature]
ATTORNEY

UNIVERSAL LINE CONCENTRATOR

Filed May 22, 1961 9 Sheets-Sheet 8

INVENTOR
G. F. ABBOTT, JR.
BY
ATTORNEY

Dec. 1, 1964 G. F. ABBOTT, JR 3,159,715

UNIVERSAL LINE CONCENTRATOR

Filed May 22, 1961 9 Sheets-Sheet 9

INVENTOR
G. F. ABBOTT, JR.
BY
ATTORNEY

United States Patent Office 3,159,715
Patented Dec. 1, 1964

3,159,715

UNIVERSAL LINE CONCENTRATOR

George F. Abbott, Jr., Berkeley Heights, N.J., assignor to Bell Telephone Laboratories, Incorporated, New York, N.Y., a corporation of New York Filed May 22, 1961, Ser. No. 111,571
17 Claims. (Cl. 179—18)

This invention relates to telephone systems and more specifically to universal line concentrator systems.

In conventional practice where no remote concentration of customer lines is effected, a pair of conductors is directly connected between each customer's circuit and an individual termination in a central office. As is well known, the cost of the conductors connecting each customer individually to the central office constitutes a significant portion of the necessary capital investment in telephone systems. In consequence, efforts have been made in the past to eliminate a substantial percentage of the conductor pairs by "concentrating" the customers' lines at a remote point and extending a substantially fewer number of conductor pairs from the point of concentration to the central office. In such a system, the customers in one physical area are directly connected to a remote switching unit which accomplishes the connection of each individual customer to one of a lesser number of trunking paths to the central office.

One advantageous form of line concentrator is the universal line concentrator. The universal line concentrator is distinguished in that it may be utilized to provide concentration between a number of customers and any of the conventional telephone central offices. In such a system, the conductor pairs which would connect each customer to the central office are replaced by an arrangement including a remote concentrator switching connected to the customers' lines, an expander switching stage connected to the central office line terminations, and a number of conductor pairs (termed trunks) connecting the concentrator to the expander.

In most line concentrator systems of the universal type, the concentrator switching stage at the remote position wherein the lines are connected to the predetermined available trunks and the expander stage adjacent the central office wherein the trunks are connected to the line terminations are operated coincidentally to effect a required connection. In certain prior art arrangements, facilities have been provided at both the concentrator and the expander for synchronously scanning the line circuits and line terminations to detect the presence of an originating or terminating service request. The synchronization scanning (termed active scanning) is usually accomplished by driving the scanners of both the remote and central office units from the same source via interconnecting signaling channels. When an originating or a terminating service request is recognized, the driving unit is disabled and the line requesting service is immediately identified by the position of the scanner units at both the remote concentrator and the expander. By this active scanning arrangement, only a trunk need be selected before the actual connection of line to trunk may be effected. Thus, these arrangements accomplish the ascertainment of a requesting customer line and the connection thereof to a trunk in a relatively rapid manner.

Prior art arrangements of the type described, although generally satisfactory and completely operative, have displayed a number of critical disadvantages.

Line concentrators of the aforementioned universal type are restricted in their use in that they are capable of only a certain degree of concentration, i.e., the ratio of customers' lines to trunks available for servicing those lines. As pointed out, the synchronizing signals are relayed between the remote concentrator switching stage and the expander switching stage of the central office via signaling channels which are normally in close physical association with the voice trunking channels, e.g., in the same cable. The capacitive loading of the signaling channels is normally such that signals of a frequency higher than a predetermined frequency are severely attenuated and distorted and therefore are infeasible for scanning use. Thus, the scanning signals should be of a frequency within the voice frequency band for which the channels have been designed. On the other hand, the probability of interference makes it desirable that no continuous synchronizing signals be transmitted within the frequency band of the voice signals on the talking trunks. Therefore since scanning may be practiced only at the relatively slow voice frequency rates, only a limited number of customers' circuits may be scanned in a period feasible for that operation.

On the other hand, if constant signaling is eliminated and arrangements are utilized wherein scanning is not commenced until the receipt of a service request, the additional time required for the selection process places an expensive burden on the system. For this reason, concentrators heretofore suggested (other than those utilizing active scanning) have been of the passive type. The signaling circuitry of the passive line concentrator is of a type including circuitry adapted to provide a signal at both the remote station and the central office unique to the line circuit requesting service so that scanning is not required. Obviously, the combination of circuitry required for accomplishing this logical function must be extremely complicated and entail a substantial system expense.

It is therefore a primary object of this invention to provide an improved universal line concentrator.

Another object of this invention is to enlarge the customer handling capabilities of universal line concentrators by increasing the degree of concentration.

A further object of this invention is to increase the degree of concentration of a universal line concentration without decreasing the speed of processing a service request and completing the connection in response thereto.

An additional object of this invention is the reduction of interference between voice channels and adjacent signaling channels transferring synchronizing signals within the voice frequency band.

A more specific object of this invention is to improve the efficiency of line concentrators by utilizing unique component circuits in a novel arrangement adapted to facilitate the use of the trunking and signaling facilities.

Briefly, the foregoing objects are accomplished in accordance with aspects of this invention by a universal line concentrator system wherein the normal synchronous scanning provisions are absent.

The arrangement utilizes a semiactive scanning system, i.e., one adapted to recognize a serivce request at the line circuits or at the central office terminations and thereafter initiate the line detection and selection sequence.

In order to eliminate the delay priorly assumed attendant on such a semiactive arrangement, extremely rapid selection means are provided at both the concentrator control circuit and at a common control circuit, which means are adapted to accomplish the central office selection for a number of line concentrators. The scanning selection sequence—though extremely rapid—is rendered so, not by increasing the scanning rate, but by changing the philosophy of the circuitry accomplishing scanning. Since a service request is present before scanning is initiated, sequential scanning of all lines is not required. In the arrangement of this invention, groups of lines are scanned together until a group indication is detected whereupon the lines of only that group need be scanned to determine the line requesting service. In this manner, a maximum of scan positions equal to the number of groups plus the number of lines in any group need be interrogated. For example, if the customers' lines are arranged in groups of ten, only twenty-four positions need be scanned to detect a request by one of 140 lines; and an average of only half that number are scanned.

Since the scanning process is not continuous and the service-request-initiated scanning is accomplished so rapidly, a very large number of lines may be handled by a concentrator of the type disclosed herein without a substantial increase in the time required to process individual calls. The actual line selection process is in fact completed in approximately the same period as required in prior concentrator arrangements for trunk selection, and the two processes may be arranged to proceed so that actual selection time remains constant. In addition, the scanning process of the arrangement hereinafter described is accomplished in such rapid fashion that the short bursts of information are transferred via the signaling channels without noticeable interference at frequencies and amplitudes which would, if continuous, cause extreme interference with voice signals. Thus, both the rate of selection and the amplitude of the synchronizing pulses may be increased appreciably in the instant arrangement.

A feature of this invention is the logical arrangement of functional components of a universal line concentrator system to eliminate the continuous transmission of scanning pulses via signaling channels so that the degree of concentration is not limited by the scanning rate.

Another feature of this invention is the use of remote concentrator circuitry wherein synchronous scanning is accomplished only after the detection of a service request.

A more specific feature of this invention relates to the remote and common selection circuitry which scan, first, to detect a request indication in a group of lines and, then, to detect the specific line requesting service within the group.

Other specific features of this invention relate to the means for providing random selection of trunking paths between the remote and central office whereby substantially equal use of the various trunking paths is accomplished and the means whereby selection circuitry is utilized multifunctionally.

These and other objects and features of this invention will be more fully appreciated from an examination of the following detailed description together with the drawing, in which:

FIGS. 1 and 2 together illustrate the general logical arrangement of the universal concentrator components of this invention in block diagram form;

In view of the substantial complexity of the instant invention, it is believed that the ends of clarity will be served by including a general description of major components and of typical terminating and originating calls followed by a specific description of the major components and the operation thereof and a detailed description of the typical calls. The format which has been followed in explaining the invention is indexed as follows:

I. General Description
- A. Introduction
- B. General Description of Major Components
  - (1) Customer Line Circuits
  - (2) Remote Line Scanner
  - (3) Remote Trunk Counter
  - (4) Remote State Selector
  - (5) Remote Signal Circuit
  - (6) Central Office Signal Circuit
  - (7) Central Office Control Circuit
  - (8) Common Control Sequence Selector and Counter Circuits
  - (9) Common Control Trunk Selector
  - (10) Expander Network Control Circuit
- C. General Description of Operation in Establishing a Connection for an Originating Call
- D. General Description of Operation in Establishing a Connection for a Terminating Call II. Detailed Description
- A. Detailed Description of Major Components and Their Operations
  - (1) Remote Line Scanner
  - (2) Remote State Selector
  - (3) Central Office Control Circuit
  - (4) The Line Counter and Sequence Selector Circuits of the Common Control Unit
  - (5) Common Control Trunk Selector
- B. Detailed Description of a Typical Originating Call
  - (1) Obtaining a Preference
  - (2) Determination of the Line Requesting Service
  - (3) The Trunk Selection Sequence
  - (4) The Connection Sequence
- C. Detailed Description of a Typical Terminating Call
  - (1) Obtaining a Preference
  - (2) Determination of the Line Requesting Service
  - (3) The Trunk Selection Sequence
  - (4) The Connection Sequence

I. GENERAL DESCRIPTION

A. *Introduction*

Figure 1:
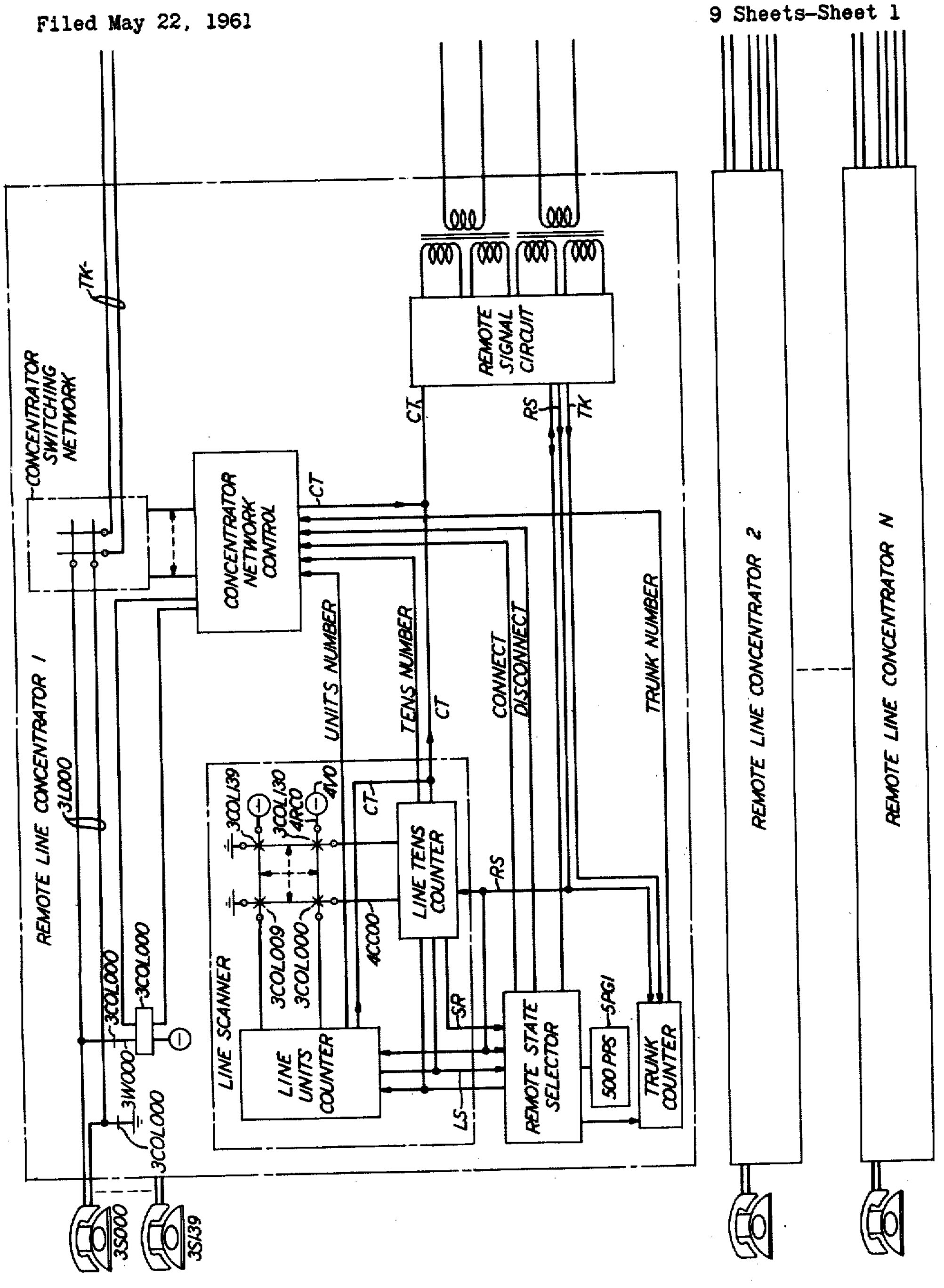
Figure 2:
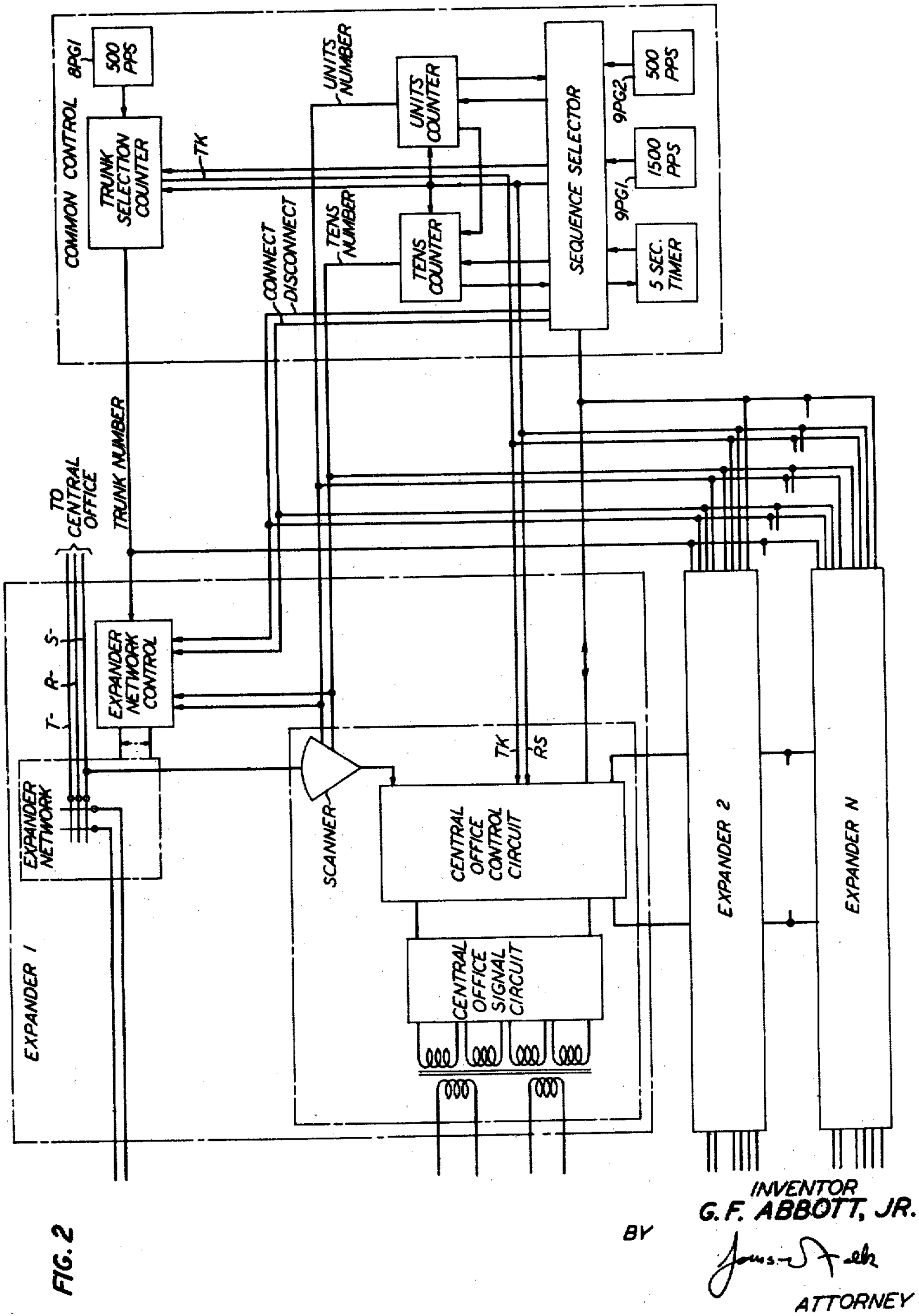

Referring to FIGS. 1 and 2, the general arrangement of the universal line concentrator of this invention may be observed. It will be noted that a number of customers' stations, represented by subsets 3S000–3S139 for example, are connected to and serviced by each remote line concentrator. The connection of each line to a trunk to a central office expander network is accomplished within the concentrator network under control of the concentrator network control and the associated selection and signaling circuitry of this invention.

Each remote line concentrator is connected by a predetermined number of voice and signaling trunks to a central office expander which includes a network in which the voice trunks are connected to the central office line terminations of the individual customer line circuits connected to the respective remote concentrators. The switching at the expander network is accomplished by the expander network control under the direction of signals from the common control. The common control accomplishes a function at the central office substantially analogous to that of the selection circuitry of the remote concentrator except that the common control circuitry is arranged to service a number of concentrators, as an economy measure. The particular concentrator to be serviced is controlled by the central office control circuit within the expander to connect circuits for preempting the use of the common control circuitry to the specific concentrator.

The exchange of information between the remote and common circuits whereby the line-to-trunk connection is accomplished takes place over two signal channels or trunks linking the particular remote concentrator circuitry to the expander circuitry at the central office.

It will be noted that the concentrator of this invention is of the delayed-disconnect type, disclosed in M. E. Krom application Serial No. 65,975, filed October 31, 1960, wherein a line remains connected to a trunk after hang-up until the use of that trunk is necessitated by the service request of another line. The foregoing delayed-disconnect arrangement eliminates the time necessary for completing a connection should a customer priorly utilizing a trunk initiate another call before the trunk is desired for other use. The system also provides that if the concentrator becomes inoperative, a number of customers will be directly connected to the central office and their service will continue without interruption during the malfunction.

In viewing the figures of the drawing, it should be noted that common symbols have been used to designate components which are well known in the art, thereby to facilitate an understanding of the invention. For example, the "detached contact" symbolism for relay contacts has been used throughout. In this scheme, a normally open contact which is closed upon the operation of a relay is represented by a cross on the line representing the conductor including the contact at the appropriate contact position, while a normally closed contact which is opened on relay operation is designated by a short line perpendicular to the line representing the conductor at the appropriate contact position.

Various other standard representational symbols are utilized. For example, the normal triangular symbol is used to designate an amplifier; and the semicircle is used to designate the various gates, with a dotted inhibiting or a nondotted enabling input terminal, if such be present. It will be noted hereinafter that two gates 5BR and 5CR are illustrated as enabled OR gates. These gates comprise standard OR gates with an additional input terminal at which a predetermined signal must be present in order to allow any output signal; in the presence of such an enabling signal, any of the standard OR input signals produce an output signal. Additionally, certain of the gates are described as differentiating OR gates. A differentiating OR gate is to be understood to comprise a standard OR gate with means for differentiating the output normally produced thereby. For example, a capacitor with a time constant which is short compared to the length of the input signal thereto may be connected in series with the output terminal to accomplish the differentiating function. The various flip-flop circuits shown are to be understood as representing any compatible one of a number of well-known bistable memory circuits operative to produce two distinct output signals in each operational condition.

Where possible, an attempt has been made to designate components by designations descriptive of the circuit functions thereof.

B. *General Description of Major Components*

(1) CUSTOMER LINE CIRCUITS

In FIG. 1 of the drawing, there are illustrated a number of customer line circuits connected to a universal line concentrator of the type illustrative of this invention. In a typical concentrator 140 lines may be serviced by twenty trunks to the central office. For example, remote line concentrator No. 1 may have connected thereto customer line circuits 3L– including subsets 3S000–3S139. Each customer line circuit 3L– includes one of the subsets 3S– and a pair of tip and ring conductors connected to the concentrator switching network.

Associated with each line circuit 3L– there may be arranged a combined line and cut-off relay 3COL–, such as that disclosed in the copending Abbott-Whitney application, Serial No. 111,569, filed on even date herewith. The arrangement of the combined relay 3COL– is such that when a customer goes off-hook, current through a first winding 3W– operates the relay 3COL– to close a line contact 3COL– associated therewith in the line scanner circuit. Each relay 3COL– also has associated therewith two normally closed cut-off contacts 3COL–. These contacts are magnetically latching and are not affected by the off-hook operation, for that operation causes current to flow in a sense such as to maintain the latching contacts 3COL– closed.

The operation of the line relay 3COL– initiates the line selection and the connection sequences for an originating call. At the completion of these sequences a signal is provided from the concentrator network control via a second winding of the 3COL– relay to cause the normally closed cut-off contacts 3COL–, as well as the line contact 3COL–, to open. On the other hand, upon the disconnection of an idle line circuit 3L– from a trunk circuit TK– at a concentrator switching network, a pulse is provided therefrom for resetting the latching cut-off contacts 3COL– of the 3COL– relay. These contacts 3COL– then remain in the closed position to initiate the connection of the associated line circuit 3L– to an appropriate trunk TK– in response to a subsequent service request.

(2) REMOTE LINE SCANNER

The remote line scanner, shown in FIG. 1, includes a matrix arrangement of column and row conductors 4CC– and 4RC– at the crossings of which are arranged the individual line relay contacts 3COL– associated with the customer line circuits 3L000–3L139. Each of the line relay contacts 3COL– associated with a specific column in the instant matrix arrangement is a member of a so-called "line tens group." For example, the line relay contacts 3COL– associated with subsets 3S000–3S009 are arrayed at crosspoints associated with a single one of the column conductors 4CC00. On the other hand, all of the line relay contacts 3COL– connected to a given row conductor 4RC– are associated with subsets 3S– having the same unit designation. For exmaple, the line relays 3COL000, 3COL010 . . . 3 COL130 associated with subsets 3S000, 3SO10 . . . 3S130 are connected to the same row conductor 4RC0.

Associated with all of the column conductors 4CC– is a line tens counter. Associated with all of the row conductors 4RC– is a line units counter. The units and tens counters are substantially identical, and each includes a ring counter circuit of a well-known type. Associated with each stage of each counter is a gating arrangement adapted to provide an indication upon the operation of the counter to set the stage associated with a conductor 4CC– or 4RC– connected to an operated relay contact 3COL–. Thus the operation of the tens counter selects the memory stage thereof associated with an energized line relay contact 3COL–; and, after the tens selection is completed, the units counter selects the memory stage thereof associated with the same operated contact. The combination of selected memory stages indicates the line 3L– requesting service. Circuitry is provided for relaying a pulse indicative of each step of the counters to a counter at the common control unit for registering the requesting line number.

On the other hand, for operating in response to synchronizing pulses transferred to the remote unit from the common conrtol unit upon the receipt of a terminating service request, each memory stage of the units and tens counters is provided with a second gating arrangement adapted to furnish the synchronizing pulses in sequential order to the stages so that the counters may be operated as standard ring counters (without responding to any operated line relay contact 3COL–) while registering the requesting line number.

(3) REMOTE TRUNK COUNTER

The remote trunk counter, shown in block form in FIG. 1, may comprise a ring counter circuit of any one of a number of well-known types. The trunk counter is arranged to operate in response to synchronization pulses transferred thereto via the TK conductor from the trunk selection counter of the common control unit, shown in FIG. 2 and to be explained hereinafter.

(4) REMOTE STATE SELECTOR

The state selector, shown in FIG. 1, comprises a three-stage binary counter arranged to control a number of gates whereby signals are transferred for accomplishing the various selection and connection processes. The binary counter is arranged so that the first stage thereof is transferred to a first condition for controlling signals necessary to the processing of an originating service request and is transferred to the other condition for controlling signals necessary to the processing of a terminating service request. The second and third stages of the binary counter circuit are driven to their respective stages in response to the completion of the various portions of the selective and connective sequences to control the actual gating selection.

(5) REMOTE SIGNAL CIRCUIT

The remote signaling circuit of FIG. 1 is of a type standard to line concentrator arrangements having alternating current coupled signaling means. Each of the signaling circuits in the remote concentrator is associated by transformer means to one of the two signaling channels to the central office expander. The signaling channels are in general adapted to handle noninterfering signals, and means are provided for disabling certain of the signaling paths in response to the enablement of others to eliminate all interference. Amplifiers are provided in each of the remote signaling paths for ascertaining that the signals received thereat and propagated therefrom are of sufficient strength for accomplishing the desired purpose.

(6) CENTRAL OFFICE SIGNAL CIRCUIT

The central office signaling circuit of FIG. 2 is substantially identical to that of the remote line concentrator. The circuitry includes transformer coupling means, amplifying means for each channel, and various inhibiting means for precluding the operation of certain paths during the operation of other paths.

(7) CENTRAL OFFICE CONTROL CIRUIT

Figure 7:
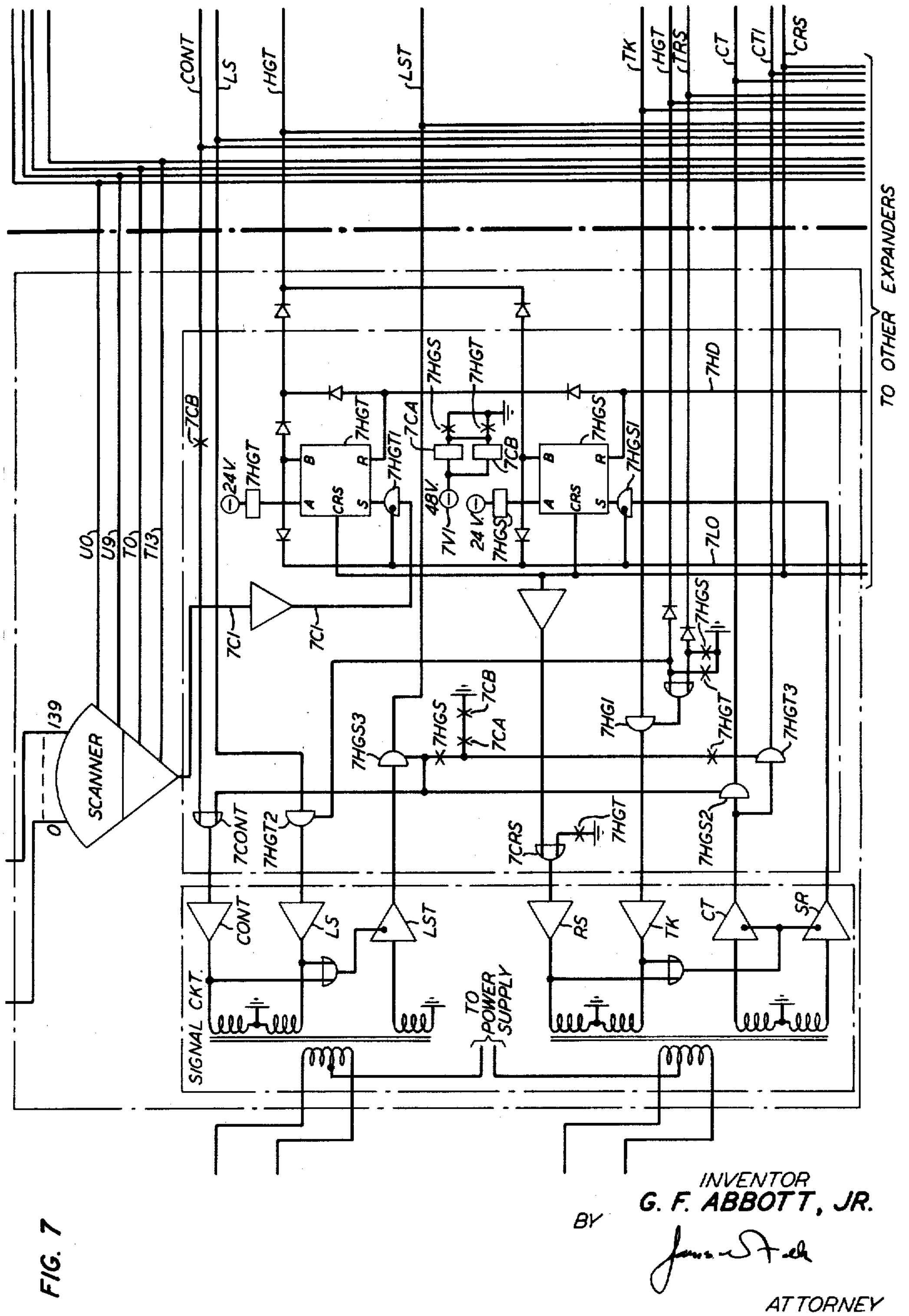
FIG. 7 is a specific illustration in block diagram form of the central office control equipment of this invention.

The central office control circuit, shown in FIG. 2, comprises a first flip-flop circuit, best seen in FIG. 7, for obtaining a preference for a terminating call and a second flip-flop circuit for obtaining a like preference for an originating service request. The operation of either of the flip-flop circuits disables all of the like flip-flops in each of the central offices associated with the same common control circuitry, connects the appropriate central office control circuit to the common control circuit and the common control circuit to the appropriate expander network control circuit, and completes paths within the central office control circuit for transferring the signals representative of that type of selection sequence between the control circuit and the remote concentrator. In addition, the operation of one of the two flip-flop circuits initiates the various selection sequences, including the line selection and trunk selection sequences.

(8) COMMON CONTROL SEQUENCE SELECTOR AND COUNTER CIRCUITS

The common control circuit, shown in FIG. 2, includes the trunk selector circuit which will be discussed separately hereinafter, the line counter circuit including a tens counter and a units counter, and the sequence selector circuit comprising various associated memory and gating circuitry for accomplishing the selection operation requisite to the establishing of a connection between a line circuit and a trunk. The units and tens counters of the common control circuit are identical. These counters receive indications from the scanner circuit of all central offices respecting any customer line requesting service on a terminating call. An indication of a terminating request disables the counters which are driving the scanner circuit at the position indicating the requesting line. This indication is remembered by means of relays in the counters. Coincidentally, the operating of the appropriate central office circuitry in response to the request initiates the selection sequence; and selection is begun, first in the tens group counter, then in the units counter, to determine the line requesting service. Indications of each step counted are sent to control the counters at the remote concentrator through a like sequence. Upon the determination of the line requesting service, the indication is established at both the remote and common control circuits.

On the other hand, when an originating service request is initiated by a remote concentrator, the line selection process is commenced at the remote unit and synchronizing pulses indicative of the tens and units selections thereat are transferred via the signaling channels to operate the tens and units counters of the common control circuitry in synchronization. In such a case, the operation of the appropriate central office circuitry disables the scan input at the common unit and resets the counters thereof so that they may follow the remote counters.

The sequence selector of the common control unit includes a number of flip-flop circuits, relays and gating circuits, the operation of which is initiated in response to the various signals transferred between the remote and common control circuits for controlling the sequence of the selection and connection operations.

(9) COMMON CONTROL TRUNK SELECTOR

The trunk selector circuit of the common control unit comprises a ring counter having a number of stages equal to the number of trunks assigned to each remote concentrator. The sleeve lead of each of the trunks connected to a concentrator is connected (upon the operation of the control office preference circuitry) to a gating arrangement associated with one of the individual memory stages of the trunk selector. The trunk selector is operated in response to pulses transferred thereto from a 500-pulse per second pulse generator and operates to transfer each indication for stepping of the trunk counter to the remote office for stepping the synchronized trunk counter thereof. Upon initiation, the trunk selection sequence continues until the sequence reaches a memory stage associated with an idle trunk, as determined by the voltage condition on the associated trunk sleeve lead. The selection sequence is terminated at this point.

Additionally, the trunk selector circuit is provided with a unique quasi-random lockout arrangement, to be described hereinafter, whereby distributed use of the trunks associated with a concentrator may be accomplished.

(10) EXPANDER NETWORK CONTROL CIRCUIT

The expander network control circuit shown in FIG. 2 includes, in general, the various circuitry necessary for operating the select and hold magnets to make the actual connection of trunk to line at the central office. It is felt that a short explanation will do nothing to further the understanding of this circuit, so the explanation is delayed until the circuit operation is explained in detail.

C. *General Description of Operation in Establishing a Connection for an Originating Call*

In FIG. 1, when a customer, for example the customer having subset 3S00, goes off-hook, the line relay 3COL000 associated with that customer line circuit is operated by the closure of a current path through the "off-hook" subset 3S00. The operation of the 3COL000 relay closes a line contact 3COL000 in the line scanner matrix of the remote concentrator to connect a predetermined search potential 4V0 via a row conductor 4RC0 to a column conductor 4CC00. The column conductor 4CC00 is connected to all of the line relay contacts 3COL000–3COL009 of the subsets in a first tens group. The application of a search potential 4V– to any column conductor 4CC– in the line scanner matrix circuit provides a signal which is transferred from the tens counter via a service request conductor SR to the state selector. The signal places the state selector in a condition to process an originating call and causes the transfer of an initiating signal to the central office via the remote signal circuit. It is to be noted that no scanning operation is in process at the remote line concentrator before the receipt of the service request.

At the central office, the initiating signal starts the various operations required for obtaining preference for the instant originating service request at the common control unit. This is accomplished by a flip-flop which sets to lock out subsequent originating or terminating requests at that central office and at any one of the central offices associated with the same common control to preclude subsequent requests from interfering with the completion of the connection for the instant service request. Additionally, upon the receipt of the initiating pulse, the central office control circuit operates to connect through signaling channels in that central office control circuit between the remote and the common control units, to connect the trunk selection counter of the common control unit to monitor the trunks of the specific requesting central office, and to provide a pulse for transfer to apprise the remote unit that a preference has been obtained.

Upon the receipt at the remote unit of the "preference-obtained" pulse from the central office control circuit, the binary counter of the state selector circuit is operated to the condition wherein it enables a gate for transferring pulses from a 500-pulse per second pulse generator 5PG1, first, to the line tens counter to determine the column conductor 4CC– requesting service and, then, to the line units counter to determine the row conductor 4RC– requesting service. In response to each pulse from the generator 5PG1 for driving the counters, a pulse is relayed to the state selector via a conductor LS and from thence to the central office. From the central office the pulse is directed to the common control for advancing in synchronization the line counter thereof. Upon the completion of each of the tens and the units counts, a completion of each of the tens and the units counts, a signal indicative of the completion is sent from the counter units at the remote concentrator via a signaling conductor CT to the common control for disabling the operating counter at the selected position.

It should be emphasized that both the remote and common line selection sequences function in a logical pattern in which a group of lines including the one requesting service is first selected and then the specific requesting line is selected from the group. In this manner, the selection process is shortened to such an extent that selection from a substantial number of trunks may be accomplished in a feasible period after the receipt of a service request.

The pulse transferred at the completion of the tens count is also directed to the trunk selection of the common unit for initiating the selection sequence threat. The trunk selection counter is equipped with a quasi-random device which operates to lock out certain of the available idle trunks during a period of the first scan cycle thereby providing for substantially equal use of the trunks. The trunk selection is accomplished in response to pulses from a 500-pulse per second generator 8PG1. The pulses from the generator are also directed during the selection sequence by the central office control circuit and a signaling conductor TK to the remote concentrator for driving the trunk counter thereof. The completion of the trunk selection sequence at the common control accomplishes the termination of trunk selection at the remote unit to leave the trunk counter thereof in a state identical to that of the common control trunk counter.

At the completion of the line and the trunk selection at the remote and common control units, a pulse is transferred from the common control unit to the expander network control to disconnect the idle line from the selected trunk. A like pulse is relayed from the common control unit to the remote unit for transferring the binary counter of the state selector to a condition wherein circuitry is operated to provide signals to the concentrator network control unit for disconnecting the idle connection on the selected trunk at the remote concentrator.

At the completion of the disconnection operation a signal is transferred from the concentrator network control via the conductor CT to apprise the common control circuitry of the completion of the disconnect operation. Upon the receipt of this signal by the common control unit, a pulse is transferred therefrom to the expander network control for initiating the connection of the selected trunk and the selected line circuit at the central office. In addition, a signal is initiated by the common control unit and is directed to the remote unit via the central office control circuit for placing the remote state selector in a condition wherein a signal is transferred to the concentrator network control for accomplishing the connection of the selected line and the selected trunk at the concentrator network.

Upon the completion of the connection at the remote concentrator network a pulse is transferred via the conductor CT to the control unit of the common control. Upon receipt of this signal at the common control unit, a resetting signal is generated and tranfserred to reset all of the circuitry of the central office, the common control and remote line concentrator. In this manner all of the circuitry of the system is placed in condition for the receipt of additional service requests, either originating or terminating.

D. *General Description of Operation in Establishing a Connection for a Terminating Call*

During any period in which no connnections are being established, the line terminations appearing at the central office are continuously scanned at the rate of 1500 pulses per second for the detection of service request pulses. This scanning is accomplished by the central office scanner which is driven in parallel with the scanners of all central offices associated with the same common control in response to the operation of the line counter thereof. The line counter is driven by a 1500-pulse per second generator 9PG1 under the control of the sequence selector of the common control unit. It should be here noted that the scanning sequence at the central office is for detection purposes only and is independent of any scanning at the remote concentrator. The high rate of scanning (approximately five times more rapid than normal scanning signals) may be utilized since there is no transmission of any of these signals via the signaling channels or in any other manner which would interfere with voice signals on the talking trunks TK–. It should be noted that this detection scanning might be eliminated at the central office entirely in favor of a matrix system like that of the remote unit. However, in the illustrative circuit, it was found economically desirable to utilize certain available circuitry for the central office including the scanner circuit.

An indication of a terminating service request appears as a ground potential on the sleeve lead S– of the requesting line termination. This indication is transferrred by the scanner to the central office control circuit where a preference is obtained for the connection sequence requisite to a terminating call. The obtaining of a preference in the central office control circuit operates to connect the common control unit to determine the service request indication appearing at the specific central office control circuit, to connect the common control unit to monitor the condition of the various trunks serving that central office, to lock out the control circuits of all other central offices associated with the same common control unit, and to provide a reset signal on the RS signaling conductor to place the remote unit line counter, state selector and trunk counter in the reset condition.

The operation of the central office control circuit also disables the line counter of the common control and the scanner in the position indicating the line requesting service. When the line counter is disabled in response to a terminating request, the requesting line number is "locked up" in the counter circuitry in a manner to be explained hereinafter which allows the line counter to be operated in the selection sequence without disturbing the remembered line number.

Upon the completion of the line number lock-up, pulses are transferred from the 9PG2 generator under control of the common control sequence selector to the line counter for identifying the line requesting service. At the same time, the pulses are relayed by the sequence selector to the line scanner of the remote concentrator via the state selector unit thereof to operate the remote line counter in synchronization with the line counter of the common control unit. Upon the completion of each portion of the line selection at the common control unit, the pulses operating the respective counter units are terminated and a signal is sent from the sequence selector of the common control to the remote unit for placing the state selector thereof in the appropriate condition for accomplishing the next step of the connection sequence.

Coincidentally with the initiation of the line search at the common control, the trunk selection counter thereat is energized to begin the search for an idle trunk. The operation of the trunk selection counter through each step of each sequence generates a pulse which is transferred via the TK signaling conductor and the central office control circuit to the remote unit for driving the trunk selection counter thereof. Upon the selection of an idle trunk at the common control unit, the synchronizing pulses are terminated and the trunk selection is accomplished.

After line and trunk selection is complete, a signal is generated by the sequence selector and is transferred to the remote state selector and from there to the concentrator network control circuit for initiating the process required for disconnecting an idle customer line from the selected trunk. In like manner, a signal is transferred from the sequence selector to the expander network control for disconnecting the idle customer line from the selected trunk at a central office. Upon the completion of the disconnect operation at the concentrator network control, a signal indicating that completion is transferred therefrom via the CT signaling conductor. The signal is relayed by the central office control circuit to the sequence selector where it initiates a signal for connecting the selected line and trunk. This signal is transferred from the sequence selector to the central office expander network control, and via the state selector of the remote unit, to the concentrator network control. On completion of the connection and the return of a signal indicative thereof from the concentrator network control, a signal is directed from the sequence selector for resetting the entire concentrator, central office and common control whereby the preference is terminated and the circuitry is prepared to process subsequent service requests.

II. DETAILED DESCRIPTION

A. *Detailed Description of Major Components and Their Operations*

(1) REMOTE LINE SCANNER

Figure 4:
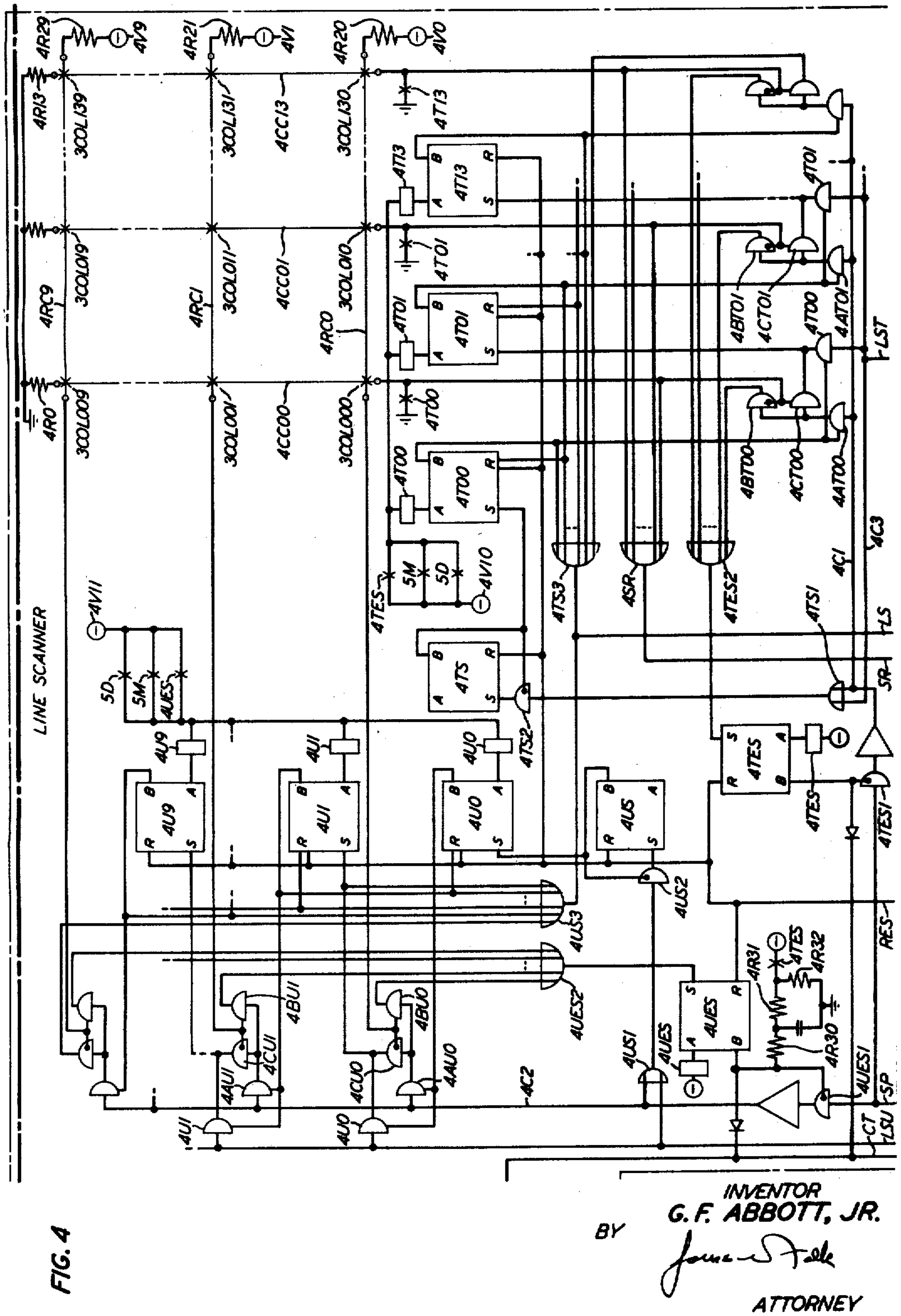
FIG. 4 is a specific illustration of the arrangement of the remote line scanner of this invention in block diagram form.

The remote line scanner circuit shown in FIG. 4 comprises a matrix arrangement of column and row conductors having at the junctions thereof in a predetermined arrangement the normally open line contacts 3COL– associted with the 3COL– relays the customer line circuits 3L–, a units counter associated with the row conductors 4RC0–9, and a tens counter associated with the column conductors 4CC00–13.

In an exemplary remote line concentrator wherein 140 customer line circuits are provided with twenty voice trunks to a central office, the customers may conveniently be divided into groups, for example, the groups may be of lines having access to the same trunks if the customers have less than complete access to all trunks. To hasten the selection process all of the customers in a group may have the line contacts 3COL– associated therewith connected at one side to one of the column conductors 4CC–. If the groups include ten line circuits 3L–, it is convenient to arrange all line circuits 3L– having the same decimal unit number to have access to the same trunks and thus have line contacts 3COL– connected to the same row conductor 4RC–. Thus, the line contact 3COL– at the intersection of the column conductor 4CC00 and the row conductor 4RC1 are associated with the subset 3S01. As will be illustrated, the selection time may be materially shortened by this arrangement.

As pointed out, all of the customer line circuits 3L– having the same unit designation have their line contacts 3COL– connected to the same row conductor 4RC– of the line scanner matrix while all of the line circuits 3L– in the same tens group have their line contacts 3COL– connected to the same column 4CC– in the line scanner matrix. Each of the column conductors 4CC– is connected via a resistor 4R0–13 to ground so that the normal potential thereon in the absence of a line contact closure is ground potential. On the other hand, each of the row conductors 4RC– is connected to a negative potential 4V0–9 via a resistor 4R20–29 so that the normal potential thereof in the absence of a line contact closure is minus 24 volts. When a subset 3S– goes off-hook the 3COL– line contact associated therewith is closed to connect the source 4V– of the selected row 4RC– to the selected column 4CC–. The negative potential of the source 4V– is applied via an OR gate 4SR and a conductor SR to the state selector for initiating the originating call connection sequence, to be explained hereinafter.

The units and tens counters are substantially identical. Each comprises a ring counter having a starting stage and a number of memory stages equal to the number of conductors in the associated coordinate of the line scanner matrix.

Each memory stage has associated therewith a first gating arrangement including the gates 4A–, 4B– and 4C– which are associated with a specific one of the matrix conductors and control the originating call selection sequence. Also associated with each memory stage is a gate 4T– or 4U– which with others thereof controls the synchronized advance of the respective counter in response to the synchronizing pulses from the common control on a terminating line selection.

The specific logical arrangement of the line scanner will be better understood from a discussion of the operation of the circuit in response to service requests. On an originating call, the closure of a 3COL– contact in response to the off-hook condition of the associated subset 3S– operates to provide a minus 24-volt potential on the column conductor 3CC– connected therewith. This potential is transferred as a single pulse by the differentiating OR gate 4SR to initiate the connection sequence for an originating service request.

Upon the receipt of the pulse indicating an originating service request by the central office and the obtaining of a preference for the request, signals from a 500-pulse per second generator are directed to the line scanner via an input conductor SP for initiating the selection sequence whereby the line circuit 3L– requesting service is determined.

All stages of the scanner are each in the reset condition, and the first pulse on the conductor SP is transferred via a 4TES1 inhibiting gate, a 4TS1 OR gate and a 4TS2 inhibiting gate to set a starting flip-flop 4TS of the tens counter. This first pulse is incapable of operating the units counter due to ground potential being applied via three resistors 4R30–32 for inhibiting a units input gate 4UES1. The setting of the flip-flop 4TS provides an output at an output terminal B thereof for setting a first memory stage 4T00 and for inhibiting the input gate 4TS2 to the starter stage.

Thus, the first of the selection pulses places the first stage flip-flop 4T00 of the tens counter of the line scanner in the set condition. Upon this setting, the B output terminal of the flip-flop 4T00 is adapted to provide an output signal which is transferred to enable the associated gate 4AT00 and, via a 4TS3 differentiating OR gate and a conductor LS, to the state selector and thence to the common control circuit. The signal is utilized at the common control for advancing the tens counter thereof in synchronization with the remote unit, as will be explained hereinafter.

As each subsequent selection pulse is transferred via the conductor SP to the tens counter, it is directed via a 4C1 conductor to the enabled one of the 4AT– gates. As explained, the 4AT– gates are enabled by the potential at the B output terminal of a memory stage 4T– during the set condition thereof. When the 4T00 stage is set, for example, the 4AT00 gate is enabled and transfers the next succeeding selection pulse in parallel to a disabling gate 4TB00 and to an enabling gate 4TC00. The gates 4TB– and 4TC– are operated in response to the potential present on the column conductor 4CC00 associated therewith. If the column conductor 4CC00 is at ground potential, signifying that no line contact 3COL– connected thereto has been closed, then the 4TC– gate is enabled and the 4TB– gate is disabled, and the selection pulse is transferred via the 4TC– gate to set the next succeeding memory stage.

On the other hand, when the 4T– memory stage associated with a column having a closed 3COL– contact connected thereto is set, the 4TB– gate is enabled and the 4TC– gate is disabled so that the selection pulse is transferred via the 4TC– gate to a 4TES2 OR gate to signify the completion of the tens selection.

From the 4TES2 OR gate the pulse signifying completion of the tens count is transferred to set a 4TES flip-flop. The setting of the 4TES flip-flop operates the 4TES relay and provides an output potential at the B terminal. The potential at the B output terminal inhibits the 4TES1 gate to preclude the further operation of the tens counter and provides a signal which is transferred via a conductor CT to the common control unit for inhibiting the tens count thereof.

Upon the operation of the 4TES relay, mentioned supra, a normally open contact 4TES is closed to provide a potential from a source 4V10 which causes current to flow in a path including the A terminal of one of the 4T– memory stages of the tens counter in the set condition. This current operates a relay 4T– associated therewith. The operation of the relay 4T– closes a contact to apply ground to the column conductor 4CC– associated with the selected memory stage 4T– and having the closed 3COL– contact. The row conductor 4RC– connected by the closed 3COL– contact to the grounded column is then furnished ground potential rather than the normal minus 24-volt potential. Ground potential is utilized as the search potential for accomplishing the units selection.

In a standard matrix, the presence of coincidental service request at different row and column intersections causes an ambiguity in that a column associated with one of the requests and a row associated with another, present an apparent signal to interrogating means. It will be noted that the possibility of an ambiguity caused by a second service request received during the processing of a first request is negated by the line scanner circuit of this invention. When a first service request is initiated, the minus 24-volt potential is provided only on the selected one of the column conductors 4CC–. Upon the selection of that conductor 4CC– by the tens counter, ground is applied via the operated crosspoint and the 4T– relay to the appropriate row conductor 4RC–. Thus, a service request intervening during the selection process will have no effect on unit selection since ground potential is present on only the row conductor connected to the already selected column conductor. In this manner, only the conductors associated with an actual service request are selected; and no ambiguity can exist between a row associated with one service request and a column associated with another.

The operation of the 4TES relay closes a contact 4TES thereby removing the ground potential inhibiting the 4UES inhibiting gate. Thus, the first selection pulse appearing on the conductor SP subsequent to the interrogation of the selected column 4CC– is transferred via an OR gate 4US1 and an inhibiting gate 4US2 to set a starting flip-flop 4US of the units counter. The setting of the 4US flip-flop provides an output potential on the B output terminal thereof which sets the 4U0 memory state and inhibits the 4US2 inhibiting gate. The inhibition of the 4US2 gate provides that further pulses appearing on the conductor SP are transferred to the subsequent memory stages 4U– of the units counter via a conductor 4C2. Upon the setting of each units memory stage 4U–, an output is furnished at the B terminal thereof for transfer via a differentiating OR gate 4US3 and the conductor LS to the common control unit for advancing the units counter thereof synchronously with the units counter of the remote unit.

The operation of the units counter proceeds in a manner substantially identical to the operation of the tens counter. As each selection pulse is received on the SP conductor, it is transferred via the 4UES1 gate and the enabled one of the 4AU– gates to the parallel arrangement of the 4BU– and 4CU– gates. Until the 4AU– gate associated with the row conductor 4RC– having ground potential thereon is enabled, the 4CU– gates transfer the selection pulses to set the next 4U– memory stage, which provides a synchronizing output to a 4US3 gate and enables the next 4AU– gate. When the 4AU– gate associated with the grounded row conductor 4RC– is enabled, the 4BU– gate associated therewtih is enabled to advance the selection pulse to a 4UES2 differentiating gate for terminating the units selection.

The pulse from the 4UES2 gate sets a 4UES flip-flop. When the 4UES flip-flop is set, a potential is provided at the B terminal thereof for disabling the 4UES1 gate and precluding further pulses on the SP conductor. The change in potential at the B terminal is also transferred on the CT conductor for apprising the common control of the completion of the units counting sequence thereby to terminate the units selection thereat. The operation of the 4UES flip-flop also operates the 4UES relay to complete a path between a source 4V11 and the A terminal of the selected one of the unit memory stages 4UL– for operating the 4U– relay thereof.

When, on the other hand, the line concentrator is processing a terminating call, the line scanner thereof is operated in the following manner. Upon the obtaining of a terminating call preference, a pulse is first transferred via the RES conductor to place all stages of the line counter in the reset condition. Upon the completion of this resetting and the appropriate state being obtained by the state selector, the line scanning process is begun at the tens counter of the common control unit and synchronization pulses are transferred via the LST conductor to the remote unit tens counter.

The first pulse received on the LST conductor is transferred via the 4C3 conductor and the 4TS1 and 4TS2 gates to set the 4TS starting flip-flop. As explained, this setting disables the 4TS2 gate and sets the 4T00 memory stage. The B output terminal of the 4T00 stage provides enabling potential at a 4T00 gate whereby the next synchronizing pulse on the LST conductor is transferred to set the 4T01 stage. In this manner, the tens counter is stepped in sequence with the common control tens counter until selection of the appropriate stage at the common control terminates the pulses directed to the line scanner on the LST conductor, as will be explained hereinafter. On this termination, the remote tens counter remains in the condition wherein the selected memory stage is set.

Upon the completion of the tens selection at the common control, the state selector circuit is placed in a condition to direct the synchronization pulses from the now proceeding units selection via a LSU conductor to the units counter of the remote line scanner. The units selection proceeds in a manner identical to the tens selection until terminated at the common control unit.

When the line selection and the trunk selection (which has preceded coincidentally therewith) have been completed at the common and remote units, the operation of, first, a disconnect relay 5D and then a connect relay 5M provide current for operating the 4T– and 4U– relays associated with the set stages of the tens and units counters, respectively, whereby the line to trunk connection is physically initiated.

(2) REMOTE STATE SELECTOR

Figure 5:
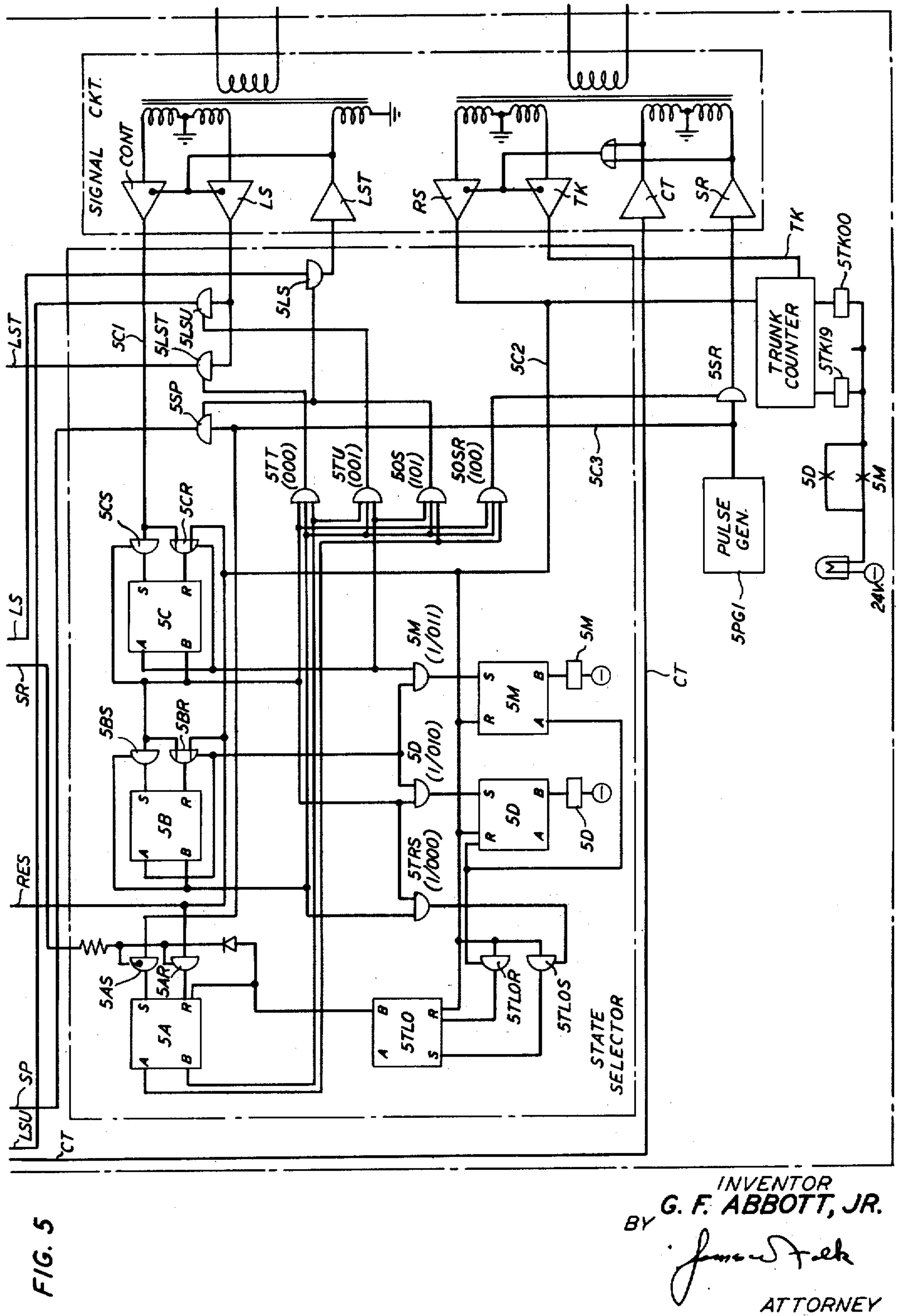
FIG. 5 is a specific illustration in block diagram form of the state selector circuit of the remote line concentrator of this invention.

The state selector circuit of the remote line concentrator, shown in FIG. 5, comprises a three-stage binary counter, a number of AND gates associated with and controlled by the binary counter for directing the transfer of the various operating signals at the remote unit, and various other circuitry, to be described hereinafter.

Each memory state of the binary counter may comprise a flip-flop circuit of any one of a number of well-known types. A setting input is provided to the first memory stage 5A from a pulse generator 5PG1 (which also provides the selection input to the line scanner), to the second memory stage 5B from the B output terminal of the third memory stage 5C, and to the third memory stage 5C from the central office via an input conductor 5C1. Resetting signals are provided to the first stage 5A under control of a terminating lockout flip-flop 5TL0, to the second stage 5B from the B terminal of the stage 5C, and to the stage 5C from the 5C1 conductor.

The application of the setting and resetting inputs is controlled by a number of input gates. For example, the presence of a service request enables a 5AS gate and disables a 5AR gate, the set condition of the flip-flop 5TL0 enables the 5AR gate and disables the 5AS gate, and the 5BS, 5BR, 5CS and 5CR gates are enabled in response to the presence of the condition within the stage opposite to the condition accomplished by signals through the enabled gate. For example, if the stage 5B is in the reset condition the 5BS enabling gate is enabled to allow input to set the memory stage 5B.

Output signals are furnished from each of the memory stages 5A–5C to AND gates 5TT, 5TU, 5OS and 5OSR. Outputs are furnished from the output terminal of the 5B and 5C memory stages to AND gates 5TRS, 5D and 5M. As will be explained hereinafter, the memory stage 5A will be placed in the set condition when the call processed is an originating call and in the reset condition when the call processed is a terminating call. As will be understood from the remaining discussion, the AND gates 5TT and 5TU which control the terminating call tens and units selection are enabled only during the terminating call connection sequence, the AND gates 5OS and 5OSR are enabled only during some portion of the originating call connection sequence, and the AND gates 5TRS, 5D and 5M are enabled at some portion of the connection sequence of both originating and terminating calls.

The operation of the state selector to control the transmission of signals to and from the remote line concentrator takes place as follows. On the receipt of an originating service request pulse from the 4SR differentiating OR gate on the SR conductor, the 5AS input gate is enabled to allow the transfer of a pulse from the 5PG1 pulse generator for setting the memory stage 5A. The setting of the stage 5A places the binary counter in the 100 condition (the 5B and 5C stages being placed in the reset condition on the completion of a connection) providing output potentials for enabling a gate 5SR. The enabling of the gate 5SR allows the transfer of pulses from the pulse generator 5PG1 via the SR signaling channel to the central office to initiate the sequence for obtaining a preference for the instant service request with respect to the associated common control unit. The enabling of the gate 5SR and the transfer of pulses therethrough also provides for the inhibiting of the RS and TK signaling channels so that pulses may not be received on those channels during the transference of the initial originating service request signal to the central office.

Upon the obtaining of a preference at the central office, a pulse is directed via the CONT signaling channel and the 5C1 conductor to place the binary counter in the 101 condition. This condition enables the AND gate 5OS which in turn enables two gates 5SP and 5LS to initiate the originating call line selection sequence. The enabling of the gate 5SP allows the transfer of the pulses from the pulse generator 5PG1 via a conductor 5C3 to the conductor SP and thence the line scanner circuit for accomplishing the appropriate line search, as explained hereinbefore. The enabling of the gate 5LS, on the other hand, provides a path for the transfer of pulses from the line scanner circuit to the common control unit for synchronizing the line counter circuit of the common control with the remote scanner. Upon the completion of each of the tens and units counts, as described hereinbefore, a pulse is transferred via the conductor CT and the signaling channel CT for indicating to the common control the completion of, first, the tens and, then, the units count whereby the common control counter is placed and left in the appropriate condition.

Upon the completion of the tens count at the remote and the common units, trunk selection begins at the common control unit and pulses are directed via the TK signaling channel to the trunk counter circuit of the remote unit. It will be noted that the transfer of the binary counter of the state selector from the 100 to the 101 condition has removed the enabling potential priorly applied to the gate 5SR so that the TK channel is free to transfer pulses to drive the trunk counter.

Upon the completion of both the line and trunk selection at the remote and common units, a signal is directed via the CONT signaling channel to place the state selector in the 110 condition whereby a disconnect AND gate 5D is enabled and a disconnect flip-flop 5D is set. The setting of the flip-flop 5D operates a relay 5D which provides for the closure of various contacts in the concentrator network, shown in block form in FIG. 1, for disconnecting any idle trunk connected to the selected trunk. The completion of the disconnect operation initiates a pulse at the concentrator network control circuit which is transferred via the CT signaling channel to apprise the central office and the common control unit of the completion. A pulse is then relayed via the CONT signaling channel to place the binary counter of the remote state selector in the 111 condition whereby an AND gate 5M is enabled and a connected flip-flop 5M is set. The setting of the flip-flop 5M operates a relay 5M to provide for the connection of the selected line and trunk within the concentrator network to complete the connection sequence.

On the completion of the connection sequence, a pulse is transferred on the RS signaling channel to reset the remote concentrator circuitry. This pulse resets the trunk counter, the line scanner and the state selector. It will be noted that the disabling potentials are by this time removed from the 5AR, 5BR and 5CR gates so that the binary counter is placed in the 000 condition.

When on the other hand a terminating service request is received at the central office, the first signal relayed to the remote concentrator state selector is a reset pulse transferred thereto via the RS signaling channel and the 5C2 conductor. This pulse operates to maintain the binary counter in the 000 condition (in which it is placed on the completion of a connection) by locking out any originating call request received thereafter.

As will be explained hereinafter, an originating call has a preference over a terminating call in the central office control circuitry. Without the lockout provision, should a terminating call request be received by the central office equipment and obtain preference coincidentally with the receipt of an originating service request at the remote station, an ambiguity will exist. The terminating call lockout flip-flop 5-TL0 and the terminating reset AND gate 5TRS controlling the setting input to the flip-flop 5TL0 provide for the resolution of this ambiguity. The AND gate 5TRS is energized by the 000 condition of the binary counter so that upon the receipt of a resetting pulse (signifying a preference obtained for a terminating call at the central office) the flip-flop 5TL0 is set to disable the gate 5AS thereby precluding the ambiguous condition. On the other hand, since the first signal received from the central office in response to an originating call preference is a pulse transferred via the CONT signaling channel to place the binary counter in the 101 condition, the AND gate 5TRS is disabled and the originating call service request is processed in a normal fashion.

Upon the obtaining of a preference for a terminating call and the setting of the 5A stage to the reset condition, the AND gate 5TT controlling terminating call tens selection is operated to provide an enabling input to a gate 5LST. The enabling of the gate 5LST allows the transfer of synchronizing pulses from the common control, appearing on the LS signaling channel, to the line scanner circuit for driving the tens counter thereof to a condition identical to that of the tens counter at the common control unit. Upon the completion of the tens count at the common unit, a pulse is relayed via the CONT signaling channel to place the binary counter in the 001 condition and thereby operate the AND gate 5TU to initiate the terminating call unit selection. The operation of the gate 5TU and the concomitant enabling of a gate 5LSU transfers the unit count synchronizing pulses appearing on the LS signaling channel to the line scanner units counter via the conductor LSU so that the remote units counter is driven in synchronization with the common control units counter.

Upon the completion of the line selection and the trunk selection operations, a signal is relayed from common control via the CONT signaling channel to place the state selector in the 010 condition wherein the disconnect AND gate 5D is enabled and the disconnect operation is accomplished by the setting of the flip-flop 5D and the concomitant operation of the 5D relay. Upon the completion of the sequence, which disconnects any line from the selected idle trunk, another CONT pulse is relayed to place the state selector in the 011 condition. In this condition, the marking AND gate 5M is enabled to set the flip-flop 5M and to operate the relay 5M for making the required trunk-to-line connection. This completes the operation of the state selector in response to a terminating call.

As at the termination of a terminating request connection, a pulse is sent via the RS channel to place all circuits of the remote line concentrator in the reset or initial condition.

(3) CENTRAL OFFICE CONTROL CIRCUIT

The central office control circuit, shown in FIG. 7, comprises a first and a second flip-flop 7HGS and 7HGT utilized for obtaining preference (i.e., selecting for the use of the instant operation only) of the common control circuitry for originating and terminating calls, respectively. The operation of either one of the two flip-flops provides for the energization of the appropriate signaling channels between the comon control and the remote office for processing the instant type of request, precludes the processing of any other request from any central office associated with the same common control unit, and connects the common control unit for establishing the appropriate connection in that one of the central offices requesting service.

The flip-flop 7HGS controls the seqence of operations involved in obtaining a preference and connecting an originating call. The flip-flop 7HGS is set in response to a service request received via the SR signaling channel at an input gate 7HHS1. The setting of the flip-flop 7HGS provides an output potential at the B output terminal thereof for resetting the flip-flop 7HGT of that central office control circuit via the 7HD conductor and for stopping the common control scanning sequence via the HGT1 conductor. The flip-flop 7HGS thus is preferred over the flip-flop 7HGT when a terminating service request is received coincidentally at the central office; and any flip-flop 7HG– prior thereto in the series in like manner provides a reset pulse and obtains preference. Additionally, the output potential provided at the B terminal of the flip-flop 7HGS is transferred via a conductor 7L0 to inhibit the input gates 7HGS1 and 7HGT1 of all of the central office control circuits connected to that common control unit thereby to obtain complete preference for the instant request by precluding all subsequent service requests.

Upon the setting of the flip-flop 7HGS in response to the receipt of a service request pulse initiated by an originating call, a relay 7HGS is operated to close a current path between ground and a negative potential 7V1 to operate two relays 7CA and 7CB. The operation of the relay 7CA closes a number of contacts 7CA to connect the common control unit to the expander network control of the instant central office. The operation of the relay 7CB provides for the closure of a number of contacts 7CB whereby the central office control circuit is connected for transferring the control signals between the remote station and the associated common control unit.

Additionally, the operation of the relay 7HGS and the concomitant operation of the relays 7CA and 7CB provide for the enabling of the paths within the central office appropriate to process an originating request and provide ground potential at an OR gate 7 CONT for initiating a pulse for transfer on the CONT signaling channel to apprise the remote station that preference has been obtained for the instant originating call service request. The paths enabled by the operation of the relays 7HGS, 7CA and 7CB include the LST channel via an enabled gate 7HGS3 for transmitting selection pulses to the common control, the TK channel via an enabled gate 7HG1 for transmitting trunk selection signals to the remote office, and the CT channel via an enabled 7HG82 gate for transmitting "operation-completed" signals. In addition, the operation of the relay 7HGS provides a ground on a TRS conductor for initiating the operation of the common control circuit.

In like manner, the setting of the flip-flop 7HGT is accomplished upon the detection of a terminating call service request by the scanner, which is transferred to the flip-flop 7HGT via a conductor 7C1 and a gate 7HGH1. The setting of the flip-flop 7HGT operates to provide an inhibiting potential at the input gates 7HGS1 and 7HGT1 of all central offices associated with that common control unit so that preference for the operated flip-flop 7HGT and the function to be accomplished thereby is obtained. The setting also provides a pulse of the HGT1 conductor for inhibiting the scanning sequence at the common unit. The operation of the flip-flop 7HGT, in addition to providing for preclusion of all other central office control circuits whereby a preference is obtained, operates a relay 7HGT which, in a manner analogous to the operation of the relay 7HGS (the operation of the relays 7CA and 7CB), provides for the connection of the common control unit to the expander network control and the central office control circuitry of the appropriate central office thereof for the transmission of signals therebetween. The operation of the relay 7HGT also provides potentials for enabling gates 7HGT2, 7HGT3 and 7HG1 whereby the transmission of signals on the CT1, the LS and the TK signaling channels is allowed. In addition, the path to the RS channel via the CRS conductor is closed within the common control circuit.

In addition to providing the aforementioned enabling potentials, the operation of the 7HGT relay provides for the initiation of the operation of the line selection counter at the common control by providing a ground potential on a conductor HGT.

Upon the completion of the connection for either an originating or a terminating call, a pulse is transferred to the central office control circuit via the CRS input conductor for resetting the "set" one of the flip-flops 7HG–. This resetting removes the inhibiting potential priorly applied via the conductor 7L0 to all central office control circuits so that each central office control circuit stands ready to obtain a preference for a service request initiated thereat. In addition, the pulse transferred for resetting the central office control circuit is propagated via the RS signaling channel to the remote concentrator for resetting all of the circuitry thereof to the initial condition (as explained hereinbefore) so that the remote circuitry is ready to process a subsequent originating or terminating connection.

(4) THE LINE COUNTER AND SEQUENCE SELECTOR CIRCUITS OF THE COMMON CONTROL UNIT

The common control unit consists of the trunk counter shown in FIG. 8 (to be described hereinafter) and the line counter and the sequence selector circuitry shown in FIG. 9.

The line counter comprises in each of the tens and units sections thereof a number of identical memory stages and various associated gating and operational circuitry arranged in ring counter form. Since the counter sections are substantially identical, only the tens counter will be described in any substantial detail.

During the static condition of the line concentrator of this invention, the scanner circuits of all central offices associated with a common control unit are driven at an extremely rapid rate under control of the line counter circuit thereof. For exampe, the scanners may be driven at a rate of 1500 pulses per second by pulses from a source 9PG1 as transmitted from the counter. Since these pulses are not transmitted to the remote station however, the extreme rate may be utilized to accomplish detection in a fraction of the time devoted thereto of prior art active concentrators. It is to be noted that a matrix type detector circuit like that as embodied in the line scanner of the remote circuit might be used instead of the central office scanner without departing from the general aspects of this invention. The central office scanner described herein was utilized as one available, and thus less expensive.

In normal scanning operation, the line counter of the common control unit is driven by the pulses from the generator 9PG1 via an inhibiting gate 9TS1. The pulses are directed in parallel via a conductor 9C1 to a number of input gates 9U0–9U9 of the units counter. The units counter has a number of memory stages 9U0–9U9 adapted to provide an output potential for energizing (with the signal from the generator 9PG1) the associated AND gate 9U–. Thus, for example, if the stage 9U0 is set, the output potential at the A terminal thereof and the input signal from the 9PG1 generator operate the 9U1 AND gate to set the next stage 9U1 and supply an enabling pulse to the 9U2 AND gate. Additionally, the setting of a stage 9U– operates to provide a potential at the B output terminal thereof for resetting the preceding stage.

The units counter proceeds in normal ring counter fashion, providing an output at the B terminal of each stage 9U– which is used for driving the scanner circuit to monitor the line terminations at all of the connected central offices. Upon the completion of each complete cycle of the units counter, an output signal is provided at the B terminal of the last stage 9U9 thereof and is transferred via a gate 9TS2 to step the tens counter by one step, in a manner identical to the operation of the units counter.

The scanning sequence proceeds in the normal manner until a terminating or originating service request is detected. At this time, the preference obtained by setting the 7HG– flip-flop provides a potential via the HGT1 conductor for terminating the scan cycle of the common unit by inhibiting the gates 9TS1 and 9TS2.

When the preference obtained is for an originating call there is also provided a pulse via a TRS conductor and on OR gate 9R for resetting the tens and units counters to the condition wherein all but the last stages are reset. The synchronizing pulses from the selection at the remote counter are then received on an LST lead from the central office control circuit. These pulses are transferred via an enabled gate 9TRS1 for providing a first input in synchronization with the selection being accomplished at the remote unit. The first pulse received from the remote unit is transferred via an enabled gate 9CT1 and an input gate 9T00.

The memory stage 9T13 being in the set condition, the gate 9T00 is enabled and the stage 9T00 is set. The tens counter proceeds in its sequence until the tens count at the remote unit is completed. At the completion of the tens count at the remote unit a pulse is transferred via the CT signaling channel to the common unit. This pulse sets a flip-flop 9CT the B terminal output potential of which enables the gate 9CT2 and disables the gate 9CT1 so that further pulses on the conductor LST are transferred to operate the units counter.

The operation of the flip-flop 9CT operates a relay 9CT to provide operating battery from a source 9V1 to relay 9T– connected in circuit with the A terminal of the "set"one of the memory stages 9T00–9T13. The operation of the relay 9CT also closes a contact to initiate the operation of the trunk selection counter as will be explained hereinafter.

As line selection proceeds at the remote unit, the pulses indicative thereof are applied to advance the common control units counter until the units selection is completed at the remote unit. When units selection is complete, a pulse is transferred from the remote unit via the conductor CT to set a flip-flop 9CT1 via a gate 9CT4, enabled from the set potential provided at the B terminal of the flip-flop 9CT. The setting of the flip-flop 9CT1 operates a relay 9CT1 to provide operating potential from a source 9V2 to the relay 9U– associated with the A terminal of the "set" one of the stages 9U– and closes a contact 9CT1 to provide ground on the coincident closure of a 9ES contact (signifying trunk selection completion) for generating a signal from a 9CON OR gate. This signal, when transferred to the remote office, indicates that line and trunk selections have been completed.

On the other hand, when the processing involves the handling of a terminating call, the line counter at the common control unit receives a disabling input signal in the form of a potential on the HG conductor from the flip-flop 7HGT on the setting thereof. This potential disables the gates 9TS1 and 9TS2 controlling the transfer of the high rate pulses from generator 9PG1 and leaves the counters in the condition in which the line termination requesting service is controlled. In the meantime, the setting of the flip-flop 7HGT and the concomitant operation of the relay 7HGT close contacts to operate a relay 9HGT1 via the conductor HGT. The operation of the relay 9HGT1 closes a contact between the source of potential 9V1 and the tens memory stages, and a contact between the source of potential 9V2 and the units memory stages. The closure of the 9HGT1 contact provides current through a relay 9T– and a relay 9U– associated with the A output terminals of the "set" ones of the tens and units stages, respectively. The operation of the relays 9T– and 9U closes self-latching contacts 9T– and 9U– associated therewith to close a lockup path with the closed 9HGT1 contacts. After the closure of the contacts 9T– and 9U–, a slow-operating relay 9T is operated (in response to the closure of a 9HGT1 contact) and opens the paths between the potentials 9V1 and 9V2 and the memory stages.

The operation of the relay 9T provides that the relays representing the line requesting service are locked up in the operated condition and, in effect, provides a memory during the further processing operation, to be explained hereinafter. As will be noted, the lockup allows the common control counters to be operated to provide selection independent of the operated lines and tens relays 9U– and 9T–.

The operation of the relay 9T also closes a contact to provide ground at the differentiating OR gate 9R whereby a reset pulse is provided for resetting both the tens and units counters to the condition wherein all but the last stages are reset, and another contact for opertaing an enabling gate 9S1 whereby pulses from a 500-pulse per second generator 9PG2 are transferred to operate the tens counter in the manner explained hereinbefore with regard to the remote selection process. Additionally, the pulses from the generator 9PG2 are transferred via a 9LS OR gate to advance the remote unit in synchronization therewith.

When the selection at the tens counter of the common control reaches the stage having a "locked-up" 9T– relay, an output signal is directed via a tens lockup gate 9TLU– (enabled via the closed 9T– contacts) to a conductor 9C1. The signal is directed by the conductor 9C3 to set a flip-flop 9OP, the potential at the B output terminal of which is applied to disable a gate 9S2 thereby terminating the pulses directed to the common and remote tens units, and to enable a gate 9S4 for transferring pulses from the generator 9PG2 to accomplish the common and remote units counts. In addition, the output potential at the B terminal of the 9OP flip-flop is transferred to inhibit a 9OP input gate, to enable a 9OP1 input gate to a 9OP1 flip-flop, and via a conductor 9C4 to provide a potential to cause the 9CON differentiating OR gate to generate a pulse for transfer to alert the remote circuitry of the completion of the tens count.

Selection at the units counter of the common unit is identical to that of the tens counter. When the appropriate "locked-up" stage is selected, a pulse is transferred via the conductor 9C1 to set the 9OP1 flip-flop thereby disabling a 9S3 gate and the units counter and operating a relay 9OP1. The operation of the relay 9OP1 closes a contact to provide a potential (upon the further closure of a contact 9ES by the completion of the trunk selection) to cause the 9CON gate to generate a pulse for transfer to the remote unit signifying line and trunk selection completion. As will be noted hereinafter, the trunk selection commences on the completion of the tens selection, either in response to the operation of the 9T slow-operating relay on a terminating call or the operation of the 9CT relay on an originating call.

On the receipt of the "line-and-trunk-selection-complete" signal on either an originating or a terminating service request, any idle line connected to the desired trunk is disconnected. The disconnection at the remote unit generates a pulse which is transferred from the remote unit via the CT or CT1 conductor to a 9CON1 OR gate and thence to a 9CON2 gate. The 9CON2 gate is enabled by the closure of the 9CT1 or 9OP1 contact and the 8ES contact and transfers the "disconnect-complete" indication to set a 9CON flip-flop. The setting of the 9CON flip-flop enables a 9CON3 gate and operates a 9CON relay to initiate a sequence, to be explained hereinafter, for connecting the selected line and trunk.

On the completion of the line-to-trunk connection, a 5CK relay operates in the central office expander control and a contact 6CK is closed to provide the B output terminal potential of the 9CON flip-flop at the 9CON OR gate. This potential generates a signal for transfer to apprise the remote office of the completion of the connection at the central office, which apprisal initiates a like connection at the remote unit. The connection at the remote unit provides a pulse on the CT or CT1 conductor which is transferred via the enabled 9CON3 gate to disable the 5-second timer and operate the 9OFL OR gate for resetting the remote, central office and common units to the initial condition.

(5) COMMON CONTROL TRUNK SELECTOR

Figure 8:
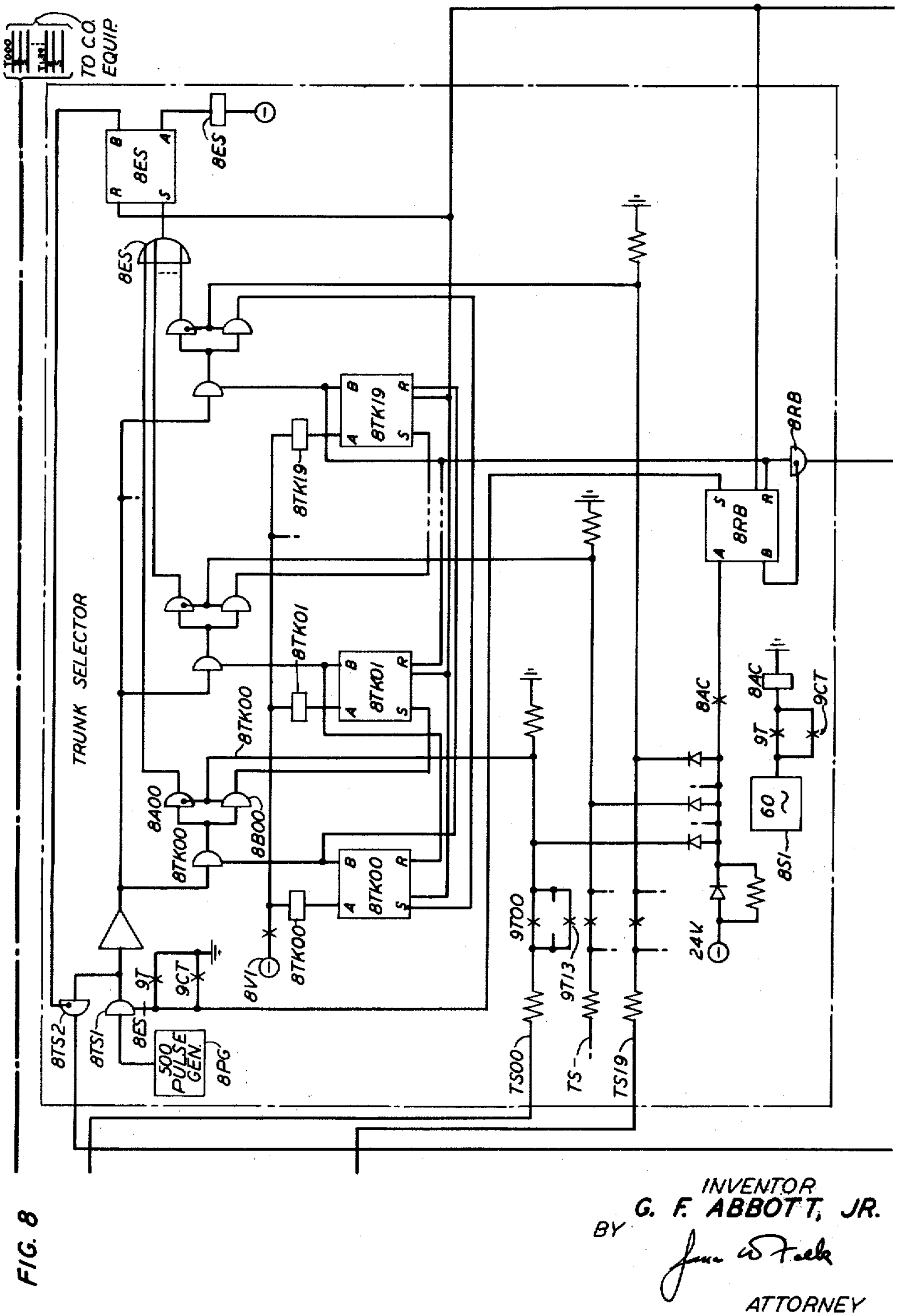
FIG. 8 is a specific illustration in block diagram form of the trunk selection counter of the common control circuit of this invention.
Figure 9:
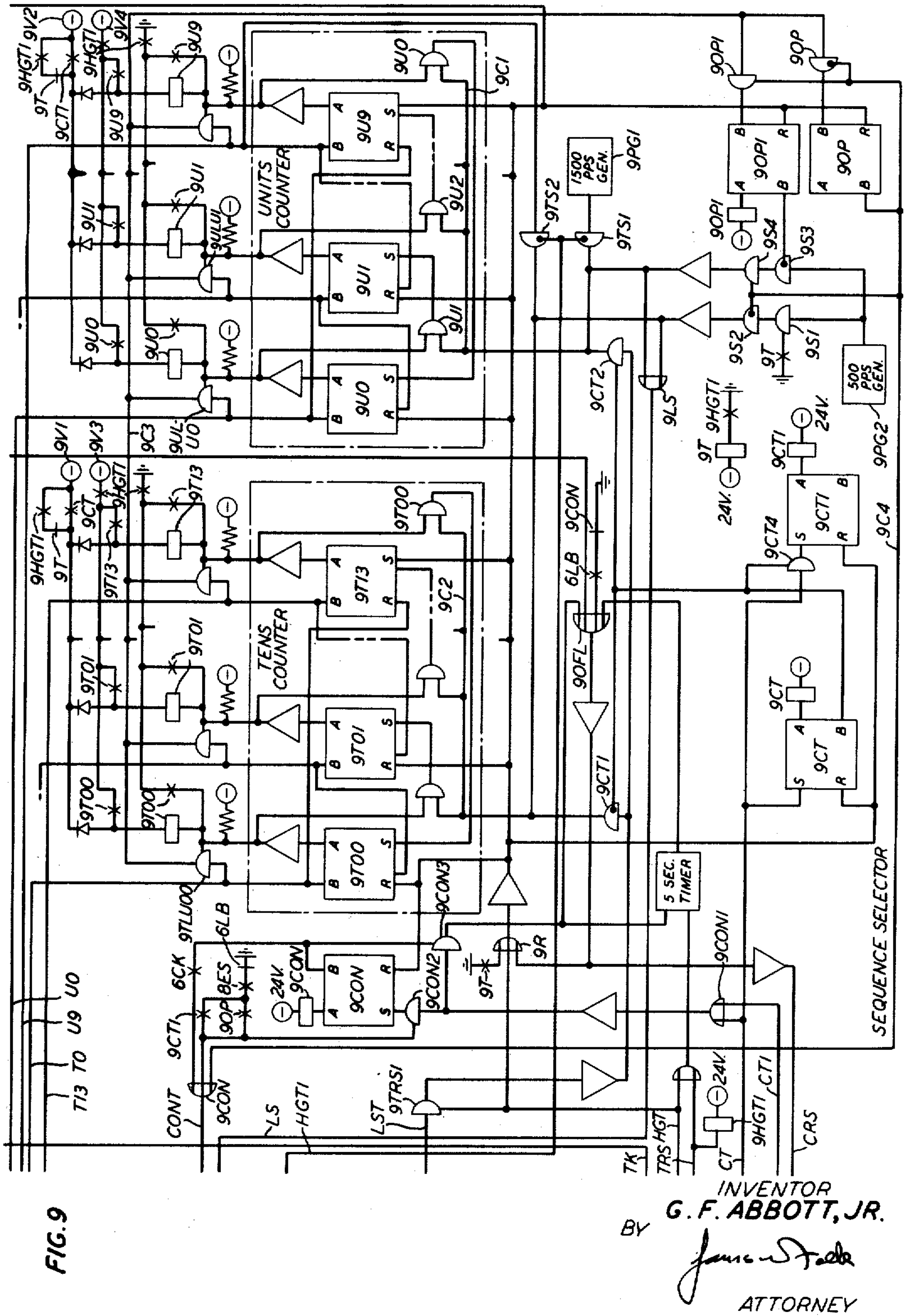
FIG. 9 is a specific illustration in block diagram form of the sequence selector and counter portions of the common control circuit of this invention.

The trunk selection counter shown in FIG. 8 comprises a number of memory stages 8TK00–8TK19 equal to the number of trunks associated with each of the remote line concentrator units. The memory stages 8TK– are connected in ring counter form whereby pulses directed from a pulse source 8PG cause the counter to step through its scanning cycle whereby proper trunk selection is provided.

The operation of the trunk selection counter is initiated upon the completion of the tens selection in the originating call sequence by the closure of a relay contact 9CT and at the initiation of the tens selection in the terminating call sequence by the closure of the slow-operating contact 9T. The originating call trunk selection is delayed to allow the tens group selection to be completed. Upon the closure of either contact 9CT or 9T, ground is provided to enable a gate 8TS1 which operates to transfer pulses from the 8PG pulse generator to the trunk selection counter and via an inhibiting gate 8TS2 and the TK conductor to the trunk selection counter of the remote unit.

Each memory stage 8TK– includes a flip-flop circuit 8K–, a gate 8TK– enabled by the set condition at the B output terminal of the flip-flop 8TK– associated therewith, and a pair of gates 8A– and 8B– receiving input in parallel from the 8TK– gate and controlled in parallel by the condition of the trunk sleeve conductor TS– associated therewith.

The first pulse from the 8PG generator is transferred by the 8TK00 gate which is enabled by the set condition of the 8TK00 flip-flop. The 8TK00 flip-flop is initially in the set condition due to a reset pulse transferred to completely reset the trunk counter on the completion of any connection sequence. The pulse transferred by the gate 8TK00 is applied as an input signal in parallel to the 8A00 and the 8B00 gates. If an idle line is associated with the 8TK00 memory stage, a negative potential is transferred via a conductor 8TK00 from the associated trunk sleeve conductor TS00 to enable the 8A00 gate. Thus the input pulse from generator 9PG is transferred via the 8A00 gate to an 8ES OR gate to set an 8ES flip-flop. On the other hand, if the trunk associated with the stage 8TK00 is busy, ground potential is applied via the 8TK00 conductor, the 8B00 gate is enabled, and the pulse is transferred to set the 8TK01 stage flip-flop of the trunk selector. The setting of the 8TK01 stage provides a pulse for resetting the preceding stage and selection proceeds in a like manner in response to subsequent input pulses.

Upon the selection of an idle trunk by the enabling of the 8A– gate associated therewith and the concomitant setting of the flip-flop 8ES, an 8ES relay is operated. The operation of the 8ES relay opens a normally closed contact to disable the 8TS1 gate and stop the transfer of pulses to the trunk selection counter. The operation of the 8ES relay also closes a contact to apply a potential from a source 8V1 to operate the 8TK– relay associated with the set memory stage 8TK– and provide trunk selection.

To provide for a quasi-random selection whereby earlier trunks scanned in the trunk selection cycle receive substantially the same traffic as those later in the cycle, the following circuitry is provided. The normal busy signal is a ground potential transferred on the sleeve lead TS– of the trunk being scanned. The operation of the 9T or 9CT relay closes a path from a source 8S1 of 60-cycle alternating current for operating a relay 8AC. The 8AC relay is periodically closed by the alternating current for a short period during which the trunk selection cycle proceeds a number of steps. Since the 8AC relay is controlled from an independent source of current, the time at which it is operated is random as compared to the selection cycle.

The operation of the 8AC relay closes a path to apply the output potential of the A terminal of an 8RB flip-flop (set on the initiation of the trunk selection sequence by the closure of a 9T or 9CT contact) to all of the trunk sleeve leads TS00–TS19. The 8RB flip-flop applies a ground potential as a false busy signal to the sleeve leads TS00–TS19 during the closure of the 8AC relay, thereby making available trunks appear busy. If the only available trunk sleeve conductor is furnished a false busy signal, the sequence proceeds until the 8TK19 stage is set to provide a signal at the B output terminal thereof for resetting the 8RS flip-flop and removing the false ground during a second scanning sequence. It will be noted that if no trunk is available on the second cycle, a pulse is transferred from the 8TK19 stage via an enabled 8RB gate to the common control sequence selector for resetting the entire concentrator system.

B. *Detailed Description of a Typical Originating Call*

(1) OBTAINING A PREFERENCE

Figure 3:
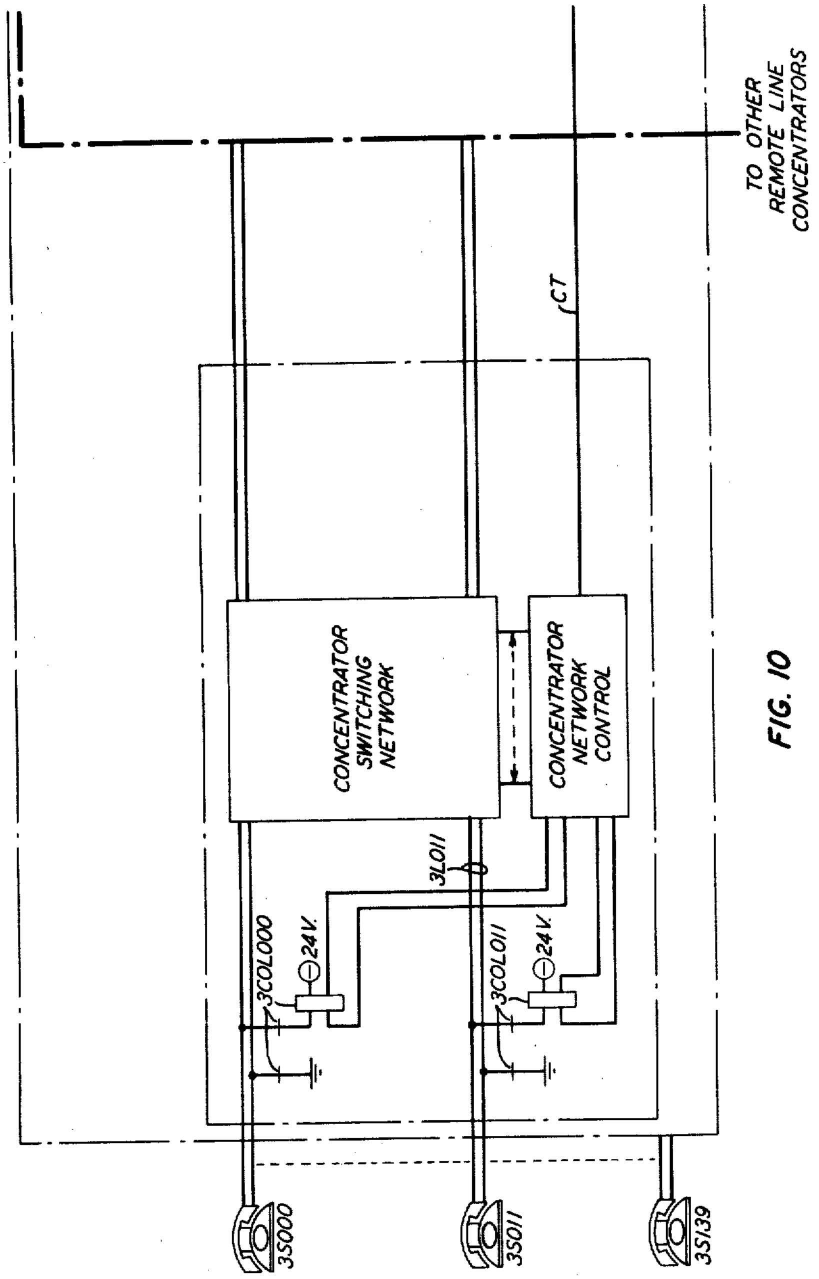
FIG. 3 is an illustration of the customers' line circuits and the concentrator switching equipment associated therewith in a line concentrator, in block diagram form.
Figure 10:
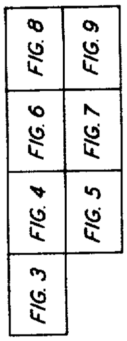
FIG. 10 is a key diagram indicating the arrangement of FIGS. 3 through 9.

Referring to FIG. 3 of the drawing, when a typical customer, for example, the customer at subset 3S011 goes off-hook, a current path is closed through subset 3S011 to operate the relay 3COL011 associated with that line 3L011. This operation of the relay 3COL011 is such as to cause the normally closed "cut-off" contacts 3COL011 to remain closed and to close the normally open line contact 3COL011 in the remote line scanner matrix, shown in FIG. 4. The closure of this contact 3COL011 connects the source 4V1 to the conductor 4CC01 and the drop in potential thereon is furnished to the OR gate 4SR. The operation of the OR gate 4SR provides a pulse which is transferred via the SR conductor to remove the disabling potential at inhibiting gate 5AS, shown in FIG. 5, to provide for the setting of the 5A stage of the state selector. Thus the closure of the 3COL011 contact in the line scanner matrix provides a detection pulse for indicating the selection and connection sequences.

When a customer goes off-hook, the state selector is in the 000 condition as provided by a reset pulse at the completion of any prior connection sequence. The removal of inhibiting potential from the 5AS gate allows the transfer of a pulse from the 500-pulse per second generator 5PG1 to set the 5A memory stage of the binary counter and transfer the state selector to the 100 condition.

The placing of the state selector in the 100 condition operates to initiate the originating call selection sequence. In the 100 condition, the gate 5OSR is enabled to enable the 5SR gate and allow the transfer of pulses from the pulse generator 5PG1 via an SR amplifier and an alternating-current signaling channel to the central office concentrator control circuitry.

At the central office control circuit, shown in FIG. 7, the first signal received on the SR channel is transferred by the enabled gate 7HGS1 to set the 7HGS flip-flop and obtain a preference at the common control for the call originated at the subset 3S011, as explained hereinbefore, of all control offices associated with the common control, by inhibiting all 7HGS1 and 7HGT1 input gates. The setting of the 7HGS flip-flop also provides a pulse on the HGT1 conductor for disabling the common control scan sequence. In addition, the setting of the 7HGS flip-flop operates the 7HGS relay to close the signaling and monitoring paths to the common control to which the instant control circuit is connected by closing the 7CA and 7CB contacts. The operation of the 7HGS relay also provides a signal on the TRS conductor to reset the common control unit and to initiate the operation of the 5-second timer (shown in FIG. 9) which is adapted to reset the entire system via the 9OFL OR gate if for some reason selection is not completed within the appropriate 5-second period.

Thus the selection of a predetermined line relay 3COL011 in response to the off-hook condition of the subset 3S011 associated therewith initiates a signal which places the central office control circuitry in a condition wherein it seizes the common control circuitry, prohibits other central offices from so seizing control, and connects through the appropriate channels for determining and making the originating call selection and connection.

When the preference operation is completed, the central office circuitry provides a pulse for apprising the remote concentrator control circuitry that preference has been obtained with respect to the common control equipment and that the selection process may begin. This is accomplished in response to the closure of 7CA, 7CB and 7HGS contacts which provide a path to connect ground potential as an input to the 7CONT OR gate. The operation of the 7CONT OR gate provides a pulse which is transferred via the CONT signaling channel to the state selector of the remote control unit. At the remote unit, the "preference-obtained" pulse is transferred on the 5C1 conductor to set the 5C memory stage and place the state selector in the 101 condition. Thus the remote unit is apprised that preference has been obtained for the originating service request at the common control unit and the selection sequence is initiated.

(2) DETERMINATION OF THE LINE REQUESTING SERVICE

When the state selector of the remote concentrator control unit receives the signal via the CONT signalling channel indicating that preference for the originating service request has been obtained at the common control unit and is placed in the 101 condition, the 5OS AND gate is enabled. The 5OS AND gate applies enabling potential to the 5SP and the 5LS enabling gates. When the 5SP gate is enabled, pulses from pulse generator 5PG1 are transferred via the SP conductor to operate the line tens and the line units counters, shown in FIG. 3.

At the time the first pulse is received at the line counter on the SP conductor, the 4UES1 gate is disabled and the pulse is transferred via the enabled 4TES1 gate to operate the tens counter.

At the tens counter, the pulse is amplified and transferred via the 4TS1 and 4TS2 gates to set the 4TS flip-flop and initiate the tens counting cycle. The setting of the 4TS flip-flop sets the 4T00 flip-flop to provide a potential at the B output terminal thereof for transfer to step the common unit counter in synchronization therewith. This potential is transferred by the differentiating OR gate 4TS3 and via the LS conductor, the enabled 5LS gate, and the LST signaling channel to the central office. At the central office, the pulse is received and relayed via the enabled 7HGS3 gate, the enabled 9TRS1 gate, and the 9CT1 gate to step the tens counter. Since the common control tens counter was reset at the initiation of the originating call sequence, the last stage thereof is in the set condition so that the 9T00 AND gate is enabled and the 9T00 memory stage is set. Thus the common and remote tens counters are placed in identical conditions, the first stage of each being set.

Meanwhile, at the remote line scanner the potential which initiated the synchronization pulse enables the 4AT00 gate. The next pulse from the 5PG1 generator is transferred via the 4AT00 gate and applied as an input signal to the 4BT00 and 4CT00 gates. Since no 3COL– contact connected to the 4CC00 conductor is closed, the 4CT00 gate is enabled and the pulse from generator 5PG1 is transferred to set the 4T01 flip-flop. The setting of the 4T01 flip-flop provides a resetting pulse to the 4T00 flip-flop and an output potential for producing a synchronizing pulse at the 4TS3 OR gate to drive the common control tens counter to the same condition. The potential at the B terminal also enables the 4AT01 gate so that the next succeeding pulse from the generator 5PG1 is transferred thereby to the 4BT01 and 4CT01 gates in parallel.

When the next pulse is received from the 5PG1 generator, it traverses the 4AT01 gate and the 4BT01 gate, which is enabled by the minus 24-volt potential applied on conductor 4CC01. The input pulse is transferred from the 4BT01 gate to the 4TES2 OR gate and thereby to set the 4TES flip-flop.

The setting of the 4TES flip-flop inhibits the 4TES1 input gate, terminating the tens selection. The setting also generates a pulse which is transferred via the CT conductor to appraise the common control unit of that termination. This pulse is received at the central office and transferred via the enabled 7HGS2 gate to set the 9CT flip-flop of the sequence selector unit. The setting of the 9CT flip-flop disables the 9CT1 gate to terminate the tens selection and enables the 9CT2 gate so that synchronizing pulses are thereafter applied to the units counter. The setting of the 9CT flip-flop also operates the 9CT relay to "lock-up" the selected stage at the common control tens counter by operating the 9T01 relay. Further the 9CT relay operation initiates the operation of the common unit trunk selection counter (as explained hereinbefore) to select an idle trunk, synchronizing pulses representing that selection being transferred via the TK conductor to the remote unit to drive the trunk counter thereof.

Meanwhile, at the remote unit, the setting of the 4TES flip-flop which terminated the tens selection operates the 4TES relay to apply operating potential to the 4T01 relay associated with the set 4T01 stage whereby a 4T01 contact is closed to provide ground potential on the 4CC01 conductor to facilitate the units search. In addition, the operation of the 4TES relay closes a contact to enable the 4UES1 gate and initiate the units selection. As noted, the provision of ground potential on the conductor 4CC01 provides that, should a new service request intervene between the initiation of the original service request and the completion of the units counter search, no ambiguity will be involved in determining the subscriber line for which the tens search has been completed; for only the appropriate conductor will have ground potential thereon. A conductor 4CC– connected to a closed 3COL– relay contact which has not been discovered by the tens counter search will exhibit a minus 24-volt potential and will be incapable of operating the units counter.

The operation of the units counter proceeds in a manner substantially identical to the operation of the line tens counter. The first pulse traversing the 4UES1 gate is transferred via the 4US1 and 4US2 gates to set the 4US starting flip-flop. The setting of the 4US flip-flop provides a potential for setting the 4U0 flip-flop and disabling the 4UES2 gate. When the 4U0 flip-flop is set, a potential is provided for enabling the 4AU0 gate and for operating the 4US3 differentiating OR gate to provide a synchronizing pulse. The synchronizing pulse is transferred via the LS conductor for driving the units counter of the common control unit to the identical condition. The pulse is applied via the now enabled 9CT2 gate and the 9U0 gate to get the 9U0 gate to set the 9U0 memory stage of the common control units counter.

At the remote unit the next succeeding pulse from the generator 5PG1 is transferred by the enabled 4AU0 gate to the 4BU0 and 4CU0 gates. The voltage condition on the row conductor 4CR0 associated therewith is minus 24 volts, there being no connection to ground, so the 4CU0 gate is enabled and the pulse is transferred to set the 4U1 memory stage and provide a synchronizing pulse via the 4US3 gate for driving the common control units counter. The setting of the 4U1 flip-flop also provides enabling potential to the 4AU1 gate so that the next pulse from the 5PG1 generator is transferred thereby to the 4BU1 and 4CU1 gates. Since the 4T01 contact is applying ground to the 4CR1 conductor, the 4BU1 gate is enabled. Thus the next pulse is transferred to set the 4UES flip-flop and terminate the units selection sequence. The setting of the 4UES flip-flop operates the 4UES relay which applies minus 24-volt potential from the source 4U11 to operate the relay 4U1 associated with the set 4U1 flip-flop. The operation of the 4U1 relay and the prior operation of the 4T01 relay accomplish the selection of the appropriate line within the remote line concentrator switching network.

In addition, the operation of the 4UES flip-flop applies disabling potential to the 4UES1 gate and generates an output pulse which is transferred by the CT conductor and the CT signaling channel to the central office for indicating the completion of the unit selection. At the central office, this pulse is relayed via the enabled 7HGS2 gate to the enabled 9CT4 gate to set the 9CT1 flip-flop and operate the 9CT1 relay. The operation of the 9CT1 relay closes a contact to apply operating potential to the 9U1 relay associated with the set 9U1 memory stage of the common control units counter for "locking-up" the line units selection thereat. Additionally, the operation of the 9CT1 relay closes a contact 9CT1 between ground and the 9CON OR gate. Upon the completion of the trunk selection, explained hereinbefore, the 8ES contact is also closed; and a pulse is transferred to apprise the common unit of the completion of the line and trunk selection operations.

Upon the completion of the line selection, a check is made to eliminate any mistake in recording the line requesting service so that a busy connection will not be torn down. The operation of the 9T01 and 9U1 relays close contacts in the expander control network, shown in FIG. 6, to connect a line busy relay 6LB to the hold magnet relay 6L011 of the selected line. When a busy line is connected to a trunk in the crossbar system at the central office utilized in this invention, the hold magnet relay 6L011 associated therewith will be operated and the 6L011 contacts closed to provide ground on the hold magnet conductor. If this ground potential is present, the 6LB relay is operated to close a 6LB contact in the sequence selector and furnish ground potential to the 9OFL gate for resetting the entire concentrator to the initial condition so that the inappropriate disconnection is not made. On the other hand, if the ground potential is not on the hold magnet contact, the 6LB relay remains inoperative and the connection process continues.

(3) THE TRUNK SELECTION SEQUENCE

Since the trunk selection was explained hereinbefore, it will be treated only briefly at this point. When the 9CT relay is operated upon the completion of the tens selection in the originating call sequence, the trunk selection selection sequence is commenced. For the purpose of this explanation it will be assumed that trunk TK00 is idle and is to be selected. As remarked hereinbefore, each group of ten customer lines may be connected for access to ten trunks only. By completing the tens selection, the group of lines and the trunks available thereto are determined. Thus in response to the operation of the 9T01 relay at the common control tens counter, a number of contacts are closed to connect the trunk sleeve conductors TS– of the trunks available to that tens group of customers to the trunk selection counter. In this manner, no idle trunk can be selected which is incapable of serving the requesting customer line.

When the 9CT relay is operated, first and second 9CT contacts are closed to provide for the operation of the trunk selection counter. The 8CT1 gate is enabled by the closure to transfer pulses to drive the memory stages, the 8RB flip-flop is set to provide a false ground indication, and the 8AC relay is connected to the source of alternating current 8S1 to initiate the random connection of the false ground furnished by the flip-flop 8RB to the sleeve conductors TS00–TS19.

Assuming that the signal from source 8S1 is not such as to immediately operate the relay 8AC, the trunk selection commences before any "lockout" of available trunks commences. Thus, the first pulse from the generator 8PG1 is transferred by the 8TK00 gate (enabled by the set condition of the 8TK00 memory stage) to the 8A00 and 8B00 gates in parallel. Since the trunk TK00 is idle, a potential is applied via the 8TK00 conductor to enable the 8A00 gate and transfer the input signal to set the 8ES flip-flop. In the meantime, the input pulse from the generator 8PG is also transferred via the 8TS2 gate to the TK conductor and thence to the remote office to step the trunk selection counter thereof in synchronization.

The setting of the 8ES flip-flop terminates the trunk selection sequence by disabling the 8TS2 gate and operating the 8ES relay to open an 8ES contact and disable the 8TS1 gate through which operating pulses are provided to the trunk counter. The operation of the 8ES relay also signals the completion of the trunk selection sequence by closing the 8ES contact to provide ground to the 9CON OR gate, as mentioned hereinbefore.

On the other hand, if on the initiation of the trunk selection sequence the source 8S1 is furnishing a current such as to operate the 8AC relay, then when the first pulse is transferred via the 8TK00 gate, it is transferred by the 8B00 gate to set the next memory flip-flop 8TK01. This obtains because the 8AC relay connects the false ground from the 8RB flip-flop to the 8TK00 conductor. The trunk counter continues to be stepped through its sequence until the 8AC relay is opened by the reversal of the alternating current through the winding thereof. Assumming no other trunk is idle, the counter completes its sequence and the 8RB flip-flop is reset by the B output potential of the last stage flip-flop 8TK13. Thus, as the ring sequence is reinitiated, the trunk 8TK00 will appear available and will be selected.

(4) THE CONNECTION SEQUENCE

As mentioned, the operation of the 9CT1 and 8ES relays closes contacts to initiate the operation of the disconnect sequence at the remote and central office units. At the central office expander control network shown in FIG. 6, the closure of the 9CT1 and 8ES contacts provides a path from a source 6V1 through normally closed 9CON and 6LB contacts, the selected trunk contact 8TK00, the closed 7CA contact to shunt the current operating the hold magnet relay 6L000. The release of the relay 6L000 disconnects the line 6L000 from the trunk at the central office.

Upon the operation of the 8ES and 9CT1 relays, ground is provided through a normally closed 6LB relay contact, to the 9CON OR gate. This potential causes the 9CON differentiating OR gate to generate a pulse which is transferred via the CONT conductor and the 7CONT OR gate to the remote unit to indicate the completion of the trunk and the units selections at the common control.

On the receipt of the "selection-completed" pulse, the binary counter of the state selector is transferred from the 101 condition to the 110 condition. When the binary counter is placed in the 110 condition, the enabling output thereof is provided to operate the AND gate 5D to provide a setting input to the disconnect flip-flop 5D for operating the 5D relay.

The operation of the 5D relay at the remote unit provides for the disconnection of any idle customer line connected to the selected trunk. This disconnection may be accomplished in the manner explained in Patent 2,962,555 of G. F. Abbott, Jr., issued November 29, 1960.

Upon the disconnection of the idle line, the concentrator network control circuit provides a pulse on the CT conductor which is applied by the CT signaling channel to the central office circuitry. This pulse is transferred via the CT conductor at the central office and the 9CON1 and 9CON2 gates (enabled by the operation of the 8ES and 9CT1 relays) to set the 9CON flip-flop. Upon setting, the 9CON flip-flop provides current to operate the 9CON relay and a signal for enabling the 9CON3 gate.

Figure 6:
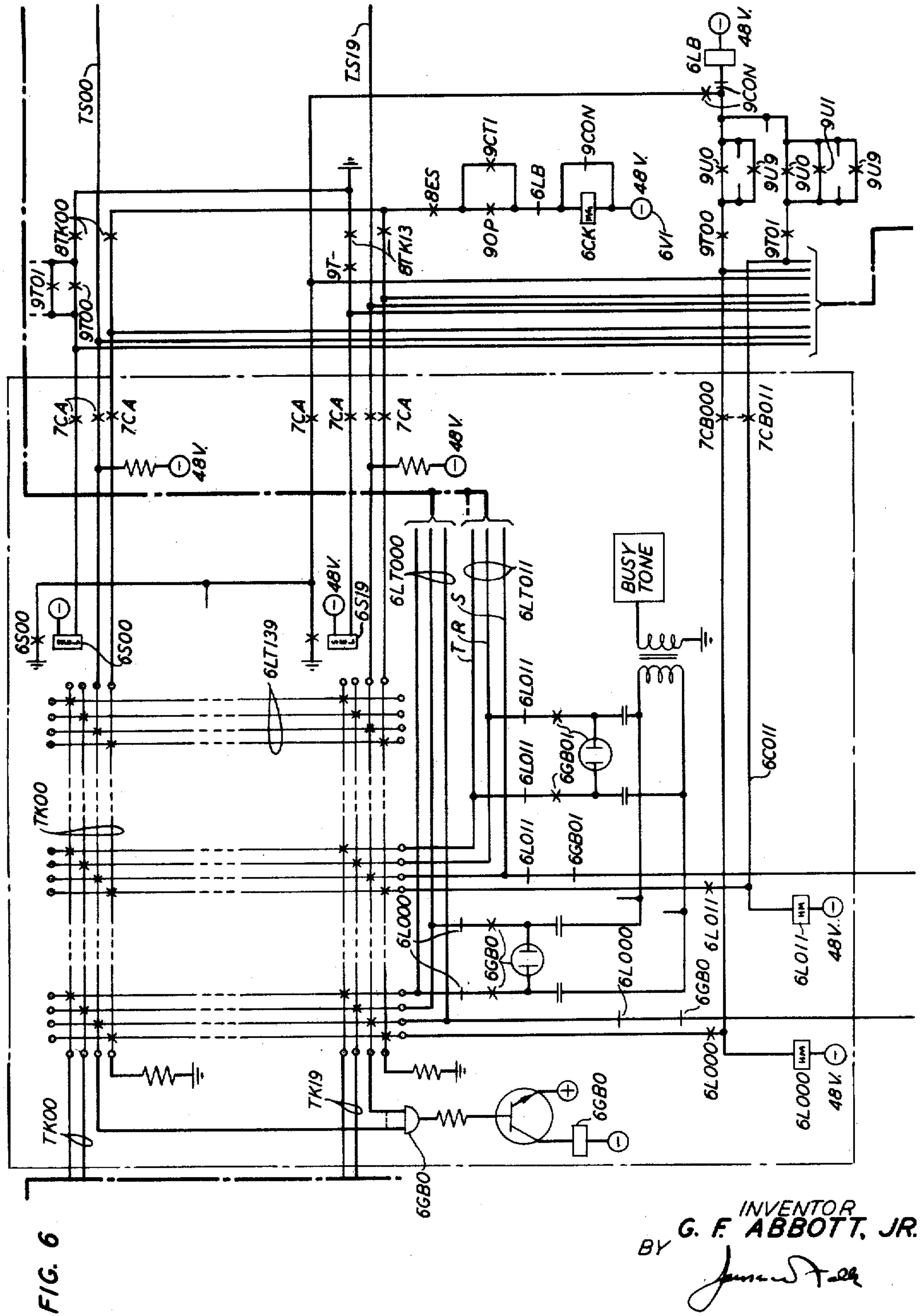
FIG. 6 is a specific illustration in block diagram form of the expander control network of the central office of this invention.

Upon the operation of the 9CON relay, the path shunting the hold magnet relay current is opened so that a line may be connected by the operation of a 9CON contact in the expander control network, shown in FIG. 6. The operation also removes the 6LB relay from the circuit so that a reset pulse will not be initiated, and connects the line and trunk as follows. The operation of the tens relay 9T01 and the trunk relay 8TK00 has priorly closed a path to operate the select magnet relay 6S00 of the appropriate trunk TK00.

On the operation of the 9CON relay, a path is closed from ground through the closed 6S00 contact, the closed 7CA contact, the closed 9CON contact, the closed 9T01 and 9U1 contacts, and the closed 7CB011 contact to operate the hold magnet relay 6L011 and make the appropriate line-to-trunk connection by closing the 6L011 contacts. A check on the operation is made by monitoring the ground connection at the relay 6L011 via the hold magnet conductor 6C011. If ground potential is present signifying operated select and hold magnet relays, a marginal 6CK relay is operated via closed 7CA, 8TK00, 8ES, 9CT1, 6LB and the closed crossbar contacts. The marginal 6CK relay operates on the ground potential to close a 6CK contact in the sequence selector which pulses the 9CON OR gate and provides a "connection-completed" indication for relay to the remote unit.

At the remote office, the "connection-completed" pulse is received on the CON signaling channel and transfers the binary counter of the state selector from the 110 to the 111 condition. In this condition, the connect AND gate 5M is operated to set the connect flip-flop 5M and operate the relay 5M. The setting of the 5M flip-flop also provides a resetting pulse to the 5D flip-flop for terminating the operation of the 5D relay.

The operation of the 5M relay causes the connection between the selected trunk and the selected line to be established, as explained in the aforementioned Abbott Patent 2,962,555. Upon the establishing of the appropriate connection, the concentrator network control circuit applies a pulse to the CT conductor which is transferred via the CT signaling channel to the common control circuit. At the common control circuit, the pulse from the CT channel is transferred via the 9CON1 OR gate and the priorly-enabled 9CON3 gate to disable the 5-second timer and to operate the 9OFL OR gate. The operation of the 9OFL OR gate provides an indication via the 9R OR gate for resetting the tens and units counter stages of the common control unit to the initial condition. The same pulse is transferred via the CRS conductor to reset the central office and release the preference obtained threat and to reset the remote concentrator to the initial condition.

C. *Detailed Description of a Typical Terminating Call*

(1) OBTAINING A PREFERENCE

The line terminations appearing for connection to the trunks at the central office are continuously scanned at the rate of 1500 pulses per second by the scanned circuit, shown in FIG. 7, in response to output potentials appearing at the B terminals of the memory stages of the tens and units counters of the common control unit. The scanned circuit may be of any well-known type such as a tree circuit gating arrangement. The scanner is connected to the sleeve conductors S0–S139 of the line terminations by independent connections thereto through the normally closed 6L– contacts. When a line termination is seized by the central office for operation in response to a terminating service request, the sleeve conductor thereof is grounded.

If all trunks available to a particular group of customers are busy, the line terminations cannot be served. To keep a terminating call from blocking the common control, circuitry is provided for furnishing a busy signal to the calling customer. The sleeve conductors TS– of all trunks in each tens group are connected to an AND gate 6GB–. When all trunks of that tens group are busy, the gate 6GB– is operated to apply input to a circuit for operating a relay 6GB–. The operation of the relay 6GB– opens normally closed contacts 6GB– connecting the associated line terminations to the scanner so that no indication will be transferred thereto. The operation of relay 6GB– also closes normally open contacts 6GB– to connect a busy tone generator to the tip and ring conductors of the associated line terminations. When a terminating service request ringing signal is received, a gas tube 6GB– is operated to cosnect the busy tone to the line and encourage the calling customer to hang up.

Assuming for illustrative purposes that a terminating service request appears on the sleeve conductor S011 of the customer line termination 6LT011, the indication is transferred by the scanner via a conductor 7C1 to the 7HGT flip-flop at the central office associated therewith. As pointed out priorly, should any other service request have obtained a prior preference and its connection sequence be as yet incomplete, one of the 7HG– flip-flops will be in the set condition and all of the 7HGT1 and 7HGS1 gates will be disabled so that the terminating request will be ignored on that scan cycle.

On the other hand, if no service request is in process at the moment, the scanner signals the presence of the instant request by transferring a pulse to set the 7HGT flip-flop, as described.

When the 7HGT flip-flop is set, a signal is provided at the B output terminal thereof for inhibiting the 9TS1 and 9TS2 gates whereby signals from the 1500 pulses per second generator 9PG1 are precluded from operating the units and tens counters of the common control unit. Thus, the line counter and the scanner are disabled at a point in their operation corresponding to the position of the requesting line.

In addition to disabling the scanner, the B terminal output potential is also applied to disable all 7HGT1 and 7HGS1 gates for precluding the processing of any other service request thereby to obtain a preference over the common control circuity. The setting of the 7HGT flip-flop operates the 7HGT relay to initiate the selection and connection sequences. The operation of the 7HGT relay provides a ground potential at a 7CRS differentiating OR gate. The potential causes the 7CRS gate to generate a signal to completely reset the units, tens and trunk counters and the state selector of the remote unit. In addition, the operation of the 7HGT relay closes contacts to operate the 7CA and 7CB relays whereby the common control unit is connected to the appropriate central office, and to apply enabling potentials to the gates 7HGT1, 7HGT2, 7HGT3 controlling the transmission of signals on the paths appropriate for establishing a terminating call connection.

The operation of the 7HGT relay initiates the selection sequence as follows. A 7HGT contact closes to apply ground potential on the HGT conductor for operating the 9HGT1 relay and for initiating the operation of the 5-second timer, explained hereinbefore. The operation of the 9HGT1 relay closes contacts to apply operating battery from sources 9V1 and 9V2 via the 9T01 and 9U1 relays associated with the set stages 9T01 and 9U1 of the tens and units counters to ground through normally closed contacts of the slow-operating 9T relay. The application of potential operates the selected 9T01 and the selected 9U1 relays to close 9U1 and 9T01 contacts associated with each thereby providing a "self-locked-up" path for continuing the operating currents thereto from sources 9V3 and 9V4 via operated 9HGT1 contacts. The operation of the 9HGT1 relay also operates the slow-operating 9T relay to remove the initial potential provided from the sources 9V1 and 9V2 for the 9T01 and 9U1 relays. These 9T01 and 9U1 relays remain in the operated condition, however, due to the locked-up operating path from the sources 9V3 and 9V4 to ground.

By means of the unique circuitry provided for locking-up of the calling line number, the units and tens counter units may be utilized for accomplishing other operations, as will be explained hereinafter, while maintaining the line number available on the counter relays.

The operation of the slow-operating 9T relay continues the selection sequence by providing ground potential at the 9R OR gate for placing the line and trunk counter stages and the other circuitry of the common control unit in the reset condition.

(2) DETERMINATION OF THE LINE REQUESTING SERVICE

As was mentioned, a pulse is sent from the 7CRS gate via the RS signaling channel to reset the remote unit upon attaining a preference for the terminating call by the setting of the 7HGT flip-flop and the operation of the 7HGT relay in response thereto. This reset pulse operates to set the terminating call lockup flip-flop 5TL0 via the 5TL0S gate. The 5TL0S gate is enabled by the operation of the 5TRS AND gate in response to the reset condition of the 5B and 5C memory stages, and only a reset pulse received before the first pulse on the CONT channel will be passed to set the 5TL0 flip-flop.

The 5TL0 flip-flop applies a resetting pulse to the 5A binary counter stage to place the state selector in the 000 condition and provides a potential for inhibiting the 5AS gate to preclude the processing of any service request originating with the customers connected to that remote concentrator during the processing of the terminating call.

At the common control sequence selector, the operation of the slow-operating 9T relay enables the 9S1 gate to allow the transmission of pulses from the 500 pulses per second 9PG2 generator for initiating the line selection. The pulses transferred by the 9S1 gate are relayed via the 9LS OR gate to drive the remote tens counter and via the conductor 9CZ to drive the tens counter of the common control unit.

The selection pulses are transferred to the remote unit via the LS conductor and are applied in parallel at the remote unit to the 5LST and 5LSU gates. The operation of gates 5LST and 5LSU is controlled by the condition of the binary counter of the state selector. The state selector being in the 000 condition in response to the terminating request preference, the 5LST gate is enabled. The first pulse relayed by the 5LST gate is transferred by the 4TS1 gate to set, first, the starting flip-flop 4TS and, in response thereto, the 4T00 flip-flop.

At the common counter, the same first pulse from the 9PG2 generator is applied at the 9T00 AND gate which is enabled by the set condition of the 9T13 memory stage. The pulse is transferred by the 9T00 AND gate to set the 9T00 stage. Thus, in response to the first selection pulse, both the common and the remote tens counters are placed in the same condition. The counting sequence continues in response to the next pulse from the 9PG2 generator to set the 9T01 tens flip-flop, associated with the locked-up 9T01 relay at the common unit. At the remote line scanners the 4T01 flip-flop is set by the same selection pulse, transferred via the enabled 4T00 AND gate.

Upon the setting of the 9T01 flip-flop, an output pulse is transferred from the B output terminal thereof via the enabled 9TLU09 gate associated therewith. The 9TLU09 gate is enabled by ground applied via the closed 9HGT1 and 9T01 relay contacts associated with the locked-up 9T01 relay. The B output potential at the selected stage is transferred via the 9TLU01 gate to the conductor 9C3 and thence to set the 90P flip-flop and terminate the tens selection.

When the 90P flip-flop is set, an output is provided from the B output terminal thereof for inhibiting the 9S2 gate and enabling the 9S4 gate. Additionally, the operation of the 90P flip-flop produces a potential which is transferred via the 9C4 conductor to the 9CON OR gate for providing a pulse to indicate to the remote unit that the tens selection at the common control has been completed. This pulse is transferred on the CONT signaling channel to step the binary counter of the state selector to the 001 condition, thereby disabling the 5LST gate to terminate the transfer of pulses to the remote tens counter and enabling the 5LSU gate.

At the common control unit, the succeeding pulses from the 9PG2 generator are transferred via the 9S3 and 9S4 gates to operate the units counter and to relay pulses via the 9LS gate to the remote unit. The pulses at the remote unit are transferred via the enabled 5LSU gate to drive the remote units counter in synchronization with the common control units counter. When the flip-flop 9U1 of the units counter is set, the B terminal output is applied via the enabled 9ULU1 gate to the 9C3 conductor and transferred thereby to set the 9OP1 flip-flop and terminate the units selection. The setting of the 9OP1 flip-flop applies disabling potential to the 9S3 gate to accomplish this result by terminating the pulses furnished for driving the units counters of both the common control and remote units. Additionally, the setting of the 9OP1 flip-flop operates the 9OP1 relay to close a contact between ground and the 9CON OR gate whereby (on completion of trunk selection and the closure of the 8ES contact) a pulse is provided to the remote unit to signal the completion of the line and trunk selection at the common control unit.

(3) THE TRUNK SELECTION SEQUENCE

The operation of the slow-operating 9T relay (which initiated the line selection sequence at the common control and remote units) also initiates the trunk selection operation by the closure of the 9T contacts in parallel with the 9CT1 contacts in the trunk selection. The operation proceeds in a manner identical to the operation priorly set out for an originating call and ends on the operation of the 8ES relay.

(4) THE CONNECTION SEQUENCE

Once the line and trunk selection have been accomplished, the connection sequence proceeds in a manner identical to the connection sequence for an originating call. For this reason, no further explanation will be given at this point.

It is to be understood that the aforementioned arrangements are merely illustrative of the principles of this invention. Other arrangements may be devised by those skilled in the art without departing from the spirit and scope of the invention.

What is claimed is:

1. A semiactive universal line concentrator comprising a remote switching stage associated with a number of customer line circuits including means for detecting a service request at any of said line circuits, means responsive to the detection of a service request for originating the generation of requesting line identification signals, and means for registering trunk identification signals; an expander switching stage associated with the terminations of said customer line circuits at a central office; a plurality of voice trunks connected between said remote and said expander switching stages; a control circuit including means for generating idle trunk identification signals, and means for registering line and trunk identification signals; and means for relaying signals between said remote switching stage and said control circuit.

2. A semiactive universal line concentrator as in claim 1 wherein said means for detecting a service request comprises a matrix arrangement of row and column conductors, a first source of potential connected to all of said row conductors, and individual means at each intersection of said matrix arrangement uniquely associated with one of said customer line circuits for connecting said row to said column conductor in response to an off-hook condition of said one of said line circuits.

3. A semiactive universal line concentrator as in claim 2 wherein said means for generating requesting line identification signals comprises scanning means responsive to a service request for detecting a connection of said first source of potential to one of said column conductors, and scanning means responsive to said last-mentioned detection for determining a connection to one of said row conductors.

4. A semiactive universal line concentrator comprising a remote switching stage associated with a number of customer line circuits including means for detecting a service request at any of said line circuits, normally quiescent means responsive to the detection of a service request at any of said line circuits for initiating the generation of requesting line identification signals, first means for registering line and trunk identification signals; an expander switching stage associated with the terminations of said csutomer line circuits at a central office; a plurality of voice trunks connected between said remote and said expander switching stages; a control circuit including means for detecting a service request at any of the terminations, means responsive to the detection of a service request at any of the terminations for generating called line identification signals, means for generating idle trunk identification signals, and second means for registering line and trunk identification signals; and means for relaying signals between said remote switching stage and said control circuit.

5. A semiactive universal line concentrator comprising a remote switching stage associated with a number of customer line circuits including means for detecting a service request at any of said line circuits, normally passive means responsive to the detection of a service request at any of said line circuits for originating the generation of requesting line identification signals, first means for registering line and trunk identification signals; an expander switching stage associated with the terminations of said customer line circuits at a central office; a plurality of voice trunks connected between said remote and said expander switching stages; a control circuit including means for detecting a service request at any of the terminations, means responsive to the detection of a service request at any of the terminations for generating called line identification signals, means for generating idle trunk identification signals, and second means for registering line and trunk identification signals; and means responsive to a registered line and a registered trunk identification signal for generating signals to control said remote and said expander switching stages to effect a connection of registered line circuit to registered trunk.

6. A semiactive universal line concentrator as in claim 5 wherein said means for generating requesting line identification signals and said means for generating called line identification signals each comprises means individual to each of said line circuits and each of said terminations for generating a service request indication in response to a service request detection, means arranging said individual means in groups, means for recognizing a service request indication unique to one of said groups, and means responsive to a recognition for determining the requesting line within the recognized one of said groups.

7. A universal line concentrator system comprising a plurality of remote switching stages, each of said stages being associated with a number of customer line circuits and including means for detecting a service request at any of the associated line circuits, normally quiescent means responsive to the detection of a service request at any of said associated line circuits for commencing the generation of requesting line identification signals, and first means for registering line and trunk identification signals; a control circuit including means for detecting a service request, means responsive to the detection of a service request for generating called line identification signals, means for generating idle trunk identification signals, and second means for registering line and trunk identification signals; a plurality of signaling and voice trunks extending from each of said remote switching stages; and a plurality of expander switching stages, each of said expander stages being associated with the central office line terminations of the customer line circuits associated with one of said remote switching stages and being connected to said plurality of signaling and voice trunks extending from said remote stage, each of said expander switching stages comprising means for relaying called line service requests from said line terminations to said control circuit, and means responsive to both requesting line and called line service requests for connecting said control circuit to one of said pluralities of expander stages associated with the line circuit displaying a service request.

8. A universal line concentrator as in claim 7 wherein said means for generating requesting line identification signals and said means for generating called line identification signals each comprises means individual to each of said line circuits and to each of said line terminations for generating a service request indication in response to a service request detection, means arranging said individual means in groups, means for recognizing a service request indication unique to one of said groups, and means responsive to a recognition for determining the requesting line within the recognized one of said groups.

9. A line scanning arrangement for use in a universal line concentrator circuit comprising a matrix arrangement of row and column conductors, a source of potential connected to all of said row conductors, means at each of the conductor crossings of said matrix uniquely associated with one of a plurality of customer line circuits and operative responsive to an off-hook condition thereof for connecting said row conductor and said column conductor at that one of said crossings to each other; means for detecting a connection at one of said crossings; first scanning means operative responsive to the detection of a connection for determining to which of said column conductors the connection has been made; and second scanning means operative responsive to a determination by said first scanning means for determining to which of said row conductors the connection has been made.

10. A trunk selector circuit comprising means for scanning a plurality of associated trunking circuits to detect a first condition of any of the trunking circuits, and means for precluding at random the detection of a first condition or any of the associated trunking circuits including a source of alternating current, an alternating-current responsive relay connected in circuit with said source of current, means for providing second condition indications, and means responsive to the operation of said relay for connecting said means for providing said second condition indications to said means for scanning.

11. A trunk selector circuit associated with a plurality of trunks comprising a plurality of memory stages associated in ring counter form, each of said memory stages comprising a gating circuit for producing an output signal in response to the coincidence of a first condition of said memory stage and an idle trunk indication; detection means individually associating one of the plurality of trunks with said gating circuit of one of said memory stages; and means for precluding at random the selection of an idle trunk including a source of alternating current, an alternating-current responsive relay in circuit with said source of current, a source of false busy indications, and means responsive to the operation of said relay for connecting said detection means to said source of false busy indications.

12. A universal line concentrator for connecting a number of associated customer line circuits to the respective line terminations thereof at a central office comprising a plurality of voice trunks; a remote switching network for connecting individual line circuits to individual ones of said voice trunks; an expander switching network for connecting individual line terminations to individual ones of said voice trunks; a remote signaling circuit for controlling said remote switching network comprising first means for detecting a service request at any of the associated customer line circuits, first means responsive to the detection of a service request at a customer line circuit for initiating the generation of a line identification signal, first means for registering line identification signals, first means for registering idle trunk identification signals, and means for controlling the sequence of operation of said remote signaling circuit; a common control circuit associated with the line terminations at the central office comprising second means for detecting a service request at any of the associated line terminations, second means responsive to the detection of a service request at a line termination for generating a line identification signal, means for generating an idle trunk identification signal, second means for registering line identification signals, second means for registering idle trunk identification signals, and means for controlling the sequence of operation of said common control circuit; and a preference circuit comprising means operative responsive to the detection of a service request at said remote signaling circuit or at said common control circuit for disabling said first and second means for detecting service requests, and means responsive to the detection of a service request at said remote signaling circuit or at said common control circuit for providing signaling channels between said remote signaling circuit and said common control circuit for relaying connection information therebetween.

13. A universal line concentrator as in claim 12 wherein said first means for detecting a service request comprises a matrix arrangement of row and column conductors including means for providing unique potentials on said conductors responsive to individual service requests; wherein said first means for generating a line identification signal comprises first and second ring counter circuits associated with said row and column conductors, respectively, each of said counter circuts comprising a plurality of memory stages, each of said stages including a bistable circuit and a first enabling gate operative responsive to a first condition of said bistable circuit and a unique potential on the conductor associated therewith for providing an output signal; and wherein said first means for registering requesting line identification signals comprises a plurality of enabling gates each associated with one of said memory stages for operating said first and second ring counter circuits.

14. A universal line concentrator as in claim 12 wherein said second means for generating a requesting line identification signal comprises a ring counter circuit having a plurality of memory stages uniquely associated with said line terminations, a plurality of gating circuits each associated with one of said stages and operative responsive to a first condition of said associated stage and the detection of a service request at an associated line termination for providing an output signal; and wherein said second means for registering requesting line identification signals includes gating means operative responsive to line identification signals for operating said ring counter circuit.

15. A universal line concentrator as in claim 12 wherein said means for controlling the sequence of operation of said remote signaling circuit comprises a binary counter circuit operative responsive to signals transferred thereto for assuming predetermined binary states, and a plurality of gating circuits individually controlled by said binary counter circuit for providing predetermined signaling channels within said remote signaling circuit.

16. A line identification and registration circuit comprising a plurality of memory stages each of said stages representing digits indicative of a telephone line number and including a first bistable circuit and a second bistable circuit, means operative responsive to a terminating service request for placing selected ones of said first bistable circuits in a first operating condition, means operative responsive to a terminating service request for operating the ones of said second bistable circuits associated with those of said first bistable circuits in said first operating condition, and means for producing output signals indicative of the sum of the digits represented by the operation of each of said second bistable circuits.

17. A universal line concentrator for connecting a plurality of customer line circuits to the respective line terminations thereof at the central office comprising a plurality of voice trunks; a plurality of remote switching networks each associated with predetermined ones of said line circuits and with predetermined ones of said voice trunks for connecting individual ones of said line circuits to individual ones of said voice trunks; a plurality of expander switching networks each associated with the line terminations of the line circuits and with the voice trunks associated with one of said remote switching networks for connecting individual line terminations to individual ones of said voice trunks; a plurality of remote signaling circuits for controlling individual ones of said remote switching networks each comprising first means for detecting a service request at any of the customer line circuits associated with the controlled one of said remote switching networks, first means responsive to the detection of a service request at a customer line circuit for originating the generation of a line identification signal, first means for registering line identification signals, first means for registering idle trunk identification signals, first means responsive to the registration of line and idle trunk identification signals for causing the associated one of said switching networks to connect a selected line circuit to a selected one of said voice trunks, and means for controlling the sequence of operation of said remote signaling circuits; a common control circuit associated with all of the line terminations of all of the associated customer line circuits comprising second means for detecting a service request at any of the line terminations, second means responsive to the detection of a service request at a line termination for generating a line identification signal, means for generating an idle trunk identification signal, second means for registering line identification signals, second means for registering idle trunk identification signals, means responsive to the registration of line and trunk identification signals for causing the expander switching network associated therewith to connect a selected line circuit to a selected one of said trunks, and means for controlling the sequence of operation of said common control circuit; and a plurality of preference circuits each associated with one of said expander switching networks and comprising means operative responsive to the detection of a service request at one of said remote signaling circuits associated therewith via voice trunks or at said common control circuit for disabling all of said first and second means for detecting service requests, and means responsive to the detection of a service request at the associated one of said remote signaling circuits or at said common control circuit for providing signaling channels between said associated one of said remote circuits and said common control circuit for relaying connection information therebetween.

References Cited in the file of this patent

UNITED STATES PATENTS

| | | |
|---|---|---|
| 1,689,343 | Hinrichsen | Oct. 30, 1928 |
| 2,405,214 | Holbrook | Aug. 6, 1946 |
| 2,465,539 | Joel | Mar. 29, 1949 |
| 2,860,190 | Allum | Nov. 11, 1958 |
| 2,938,959 | McCreary | May 31, 1960 |
| 2,976,367 | Bruce | Mar. 21, 1961 |
| 3,022,382 | Ewin | Feb. 20, 1962 |
| 3,029,315 | Radcliffe | Apr. 10, 1962 |